US005482099A

United States Patent [19]

Kajiwara et al.

[11] Patent Number: 5,482,099
[45] Date of Patent: Jan. 9, 1996

[54] PNEUMATIC RADIAL TIRE INCLUDING A TREAD PORTION DIVIDED INTO FOUR CIRCUMFERENTIAL REGIONS

[75] Inventors: Shinzo Kajiwara; Yoshio Konii; Minao Yanase, all of Kobe, Japan

[73] Assignee: Sumitomo Rubber Industries, Ltd., Kobe, Japan

[21] Appl. No.: 54,828

[22] Filed: Apr. 30, 1993

Related U.S. Application Data

[60] Continuation of Ser. No. 695,324, May 3, 1991, abandoned, which is a division of Ser. No. 441,973, Nov. 28, 1989, abandoned.

[30] Foreign Application Priority Data

| Nov. 30, 1988 | [JP] | Japan | 63-302983 |
| Nov. 30, 1988 | [JP] | Japan | 63-302984 |
| Nov. 30, 1988 | [JP] | Japan | 63-302985 |
| Nov. 30, 1988 | [JP] | Japan | 63-302988 |
| Nov. 30, 1988 | [JP] | Japan | 63-302990 |

[51] Int. Cl.$^6$ ................... B60C 101/00; B60C 111/00
[52] U.S. Cl. .............. 152/209 R; 152/209 A; 152/209 D; 152/526; 152/527
[58] Field of Search ........... 152/209 R, 209 A, 152/209 D, 526, 527; D12/145–147

[56] References Cited

U.S. PATENT DOCUMENTS

| D. 265,302 | 7/1982 | Kojima et al. | D12/145 |
| D. 287,841 | 1/1987 | Ono | D12/147 |
| D. 295,398 | 4/1988 | Sedlack | D12/147 |
| D. 301,024 | 5/1989 | Himuro et al. | D12/147 |
| D. 301,445 | 6/1989 | Terada | D12/147 |
| D. 303,946 | 10/1989 | Graas | D12/147 |
| D. 308,034 | 5/1990 | Graas | D12/147 |
| D. 311,163 | 10/1990 | Rabinovich | D12/147 |
| 3,998,256 | 12/1976 | Verdier | 152/209 R |
| 4,194,548 | 3/1980 | Roger | 152/209 R |
| 4,278,121 | 7/1981 | McDonald | 152/209 R |
| 4,387,754 | 6/1983 | Mirtain et al. | 152/209 R |
| 4,649,975 | 3/1987 | Kogure et al. | 152/209 R |
| 4,690,189 | 9/1987 | Bradisse et al. | 152/209 R |
| 4,723,585 | 2/1988 | Mechtel . | |
| 4,730,654 | 3/1988 | Yamashita et al. . | |
| 4,733,708 | 3/1988 | Kindry et al. . | |
| 4,794,965 | 1/1989 | Ragnier | 152/209 R |
| 4,796,683 | 1/1989 | Kawabata et al. | 152/209 R |
| 4,807,679 | 2/1989 | Collette et al. | 152/209 R |
| 4,819,704 | 4/1989 | Misawa et al. | 152/526 |
| 4,819,705 | 4/1989 | Caretta | 152/527 |
| 4,823,855 | 4/1989 | Goergen et al. | 152/209 R |
| 4,865,101 | 9/1989 | Williams . | |
| 5,062,461 | 11/1991 | Noguchi | 152/209 R |
| 5,109,903 | 5/1992 | Watanabe et al. | 152/209 R |
| 5,137,068 | 8/1992 | Loidl et al. | 152/209 R |

FOREIGN PATENT DOCUMENTS

| 0237462 | 9/1987 | European Pat. Off. . | |
| 1548673 | 10/1963 | France . | |
| 292508 | 12/1987 | Japan | 152/209 D |
| 61607 | 3/1988 | Japan | 152/209 A |
| 275405 | 11/1988 | Japan | 152/526 |
| 3253409 | 11/1991 | Japan | 152/209 R |

OTHER PUBLICATIONS

Yokohama Publication, Yokohama Tire Corporation, 1986 Mechanics of Pneumatic Tires, ed. Samuel Clark: U.S. Dept. of Transportation, Aug. 1981, pp. 131, 219–224.

Primary Examiner—Steven D. Maki
Attorney, Agent, or Firm—Birch, Stewart, Kolasch & Birch

[57] ABSTRACT

A pneumatic radial tire comprising a carcass and a belt comprising belt plies composed of steel belt cords wherein at least two circumferential grooves are constructed in the tread part continuously in the direction of the tire's equator, and lateral grooves in some parts defined by dividing the tread part in the direction of the tire's axis into approximately three or four equal areas. The tire prevents one-side drifting of a car in driving, improves a straight-forward driving performance.

2 Claims, 17 Drawing Sheets

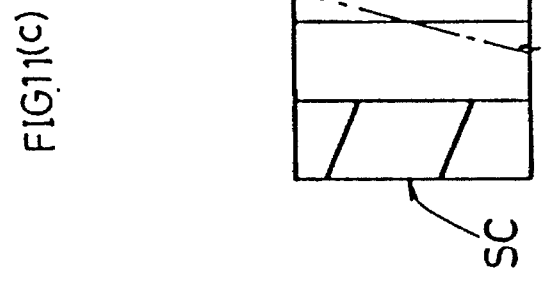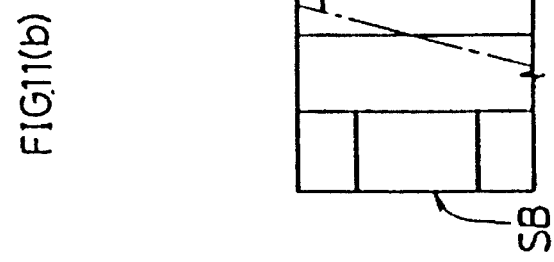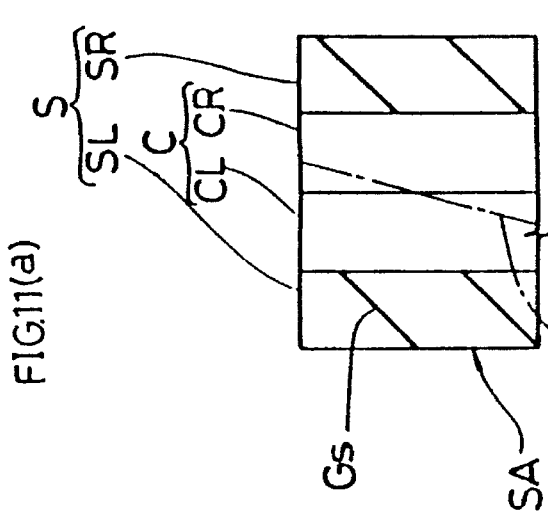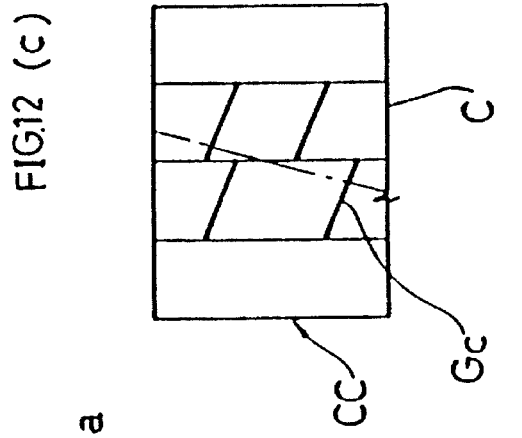

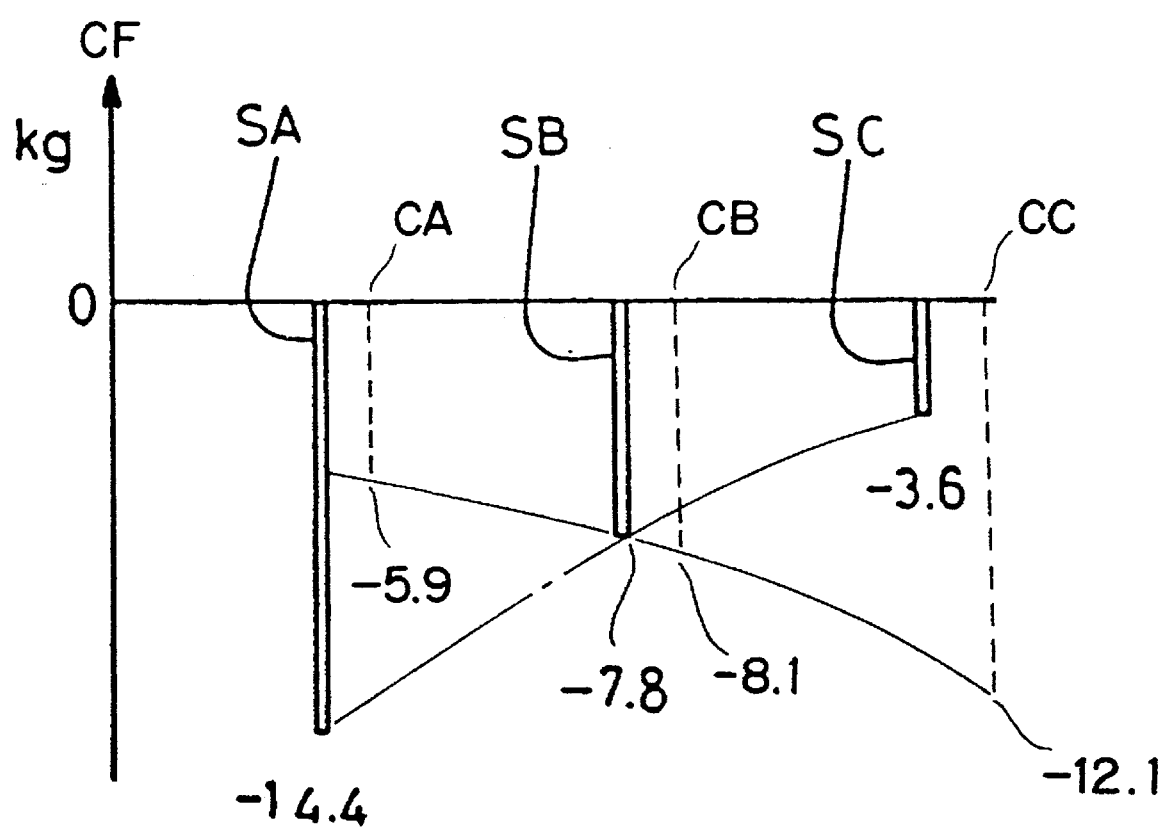

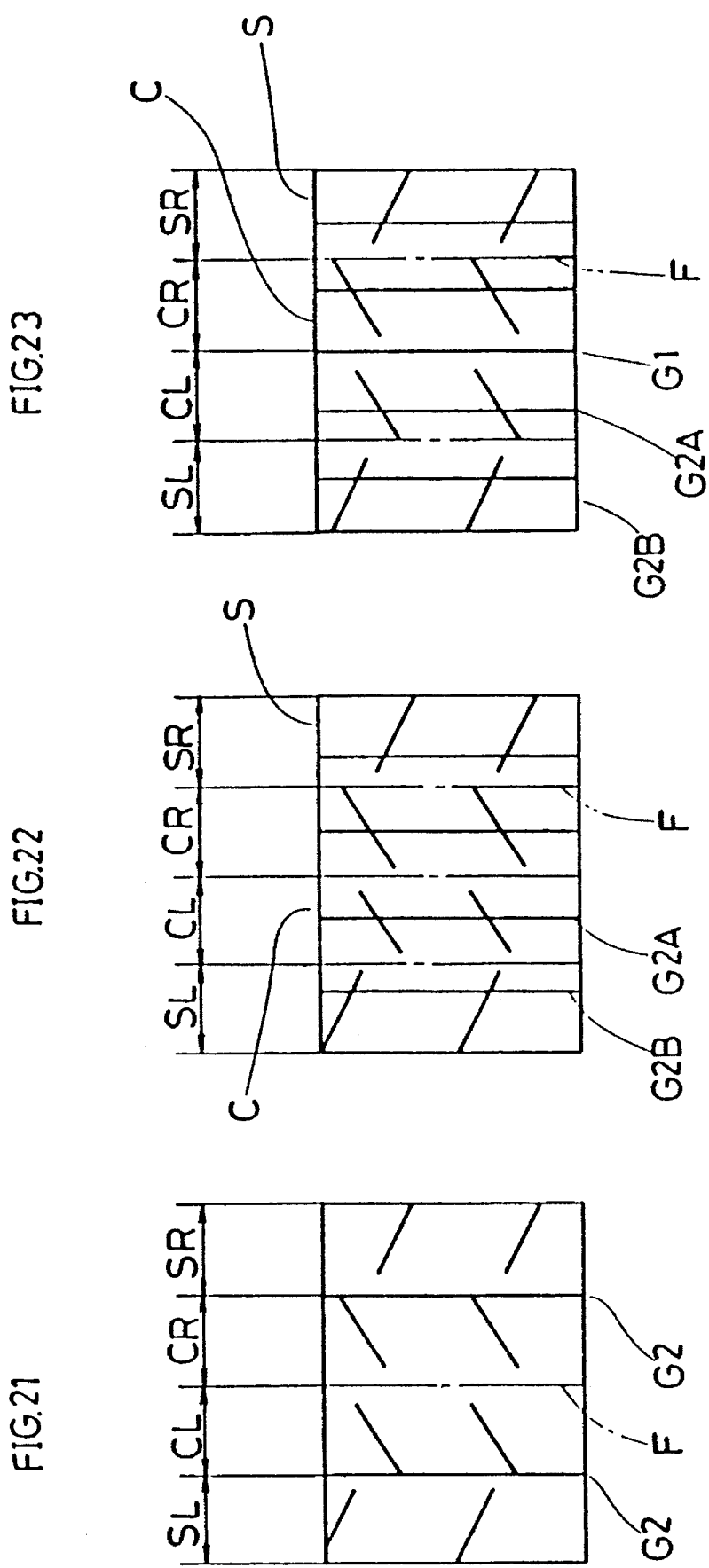

PNEUMATIC RADIAL TIRE INCLUDING A TREAD PORTION DIVIDED INTO FOUR CIRCUMFERENTIAL REGIONS

This application is a continuation of application Ser. No. 07/695,324 filed on May 3, 1991, now abandoned, which is a divisional of application Ser. No. 07/441,973 filed on Nov. 28, 1989, now abandoned.

BACKGROUND OF THE INVENTION

The present invention relates to a pneumatic radial tire, and more particularly to a pneumatic radial tire which reduces one-side drifting in driving and can be preferably used for passenger cars.

Radial tires which can improve steering stability, comfortable riding performance and so on are widely used. Tires which are superior in straight-forward driving performance by preventing one-side drifting of a car in order to increase the driving safety of a car are being demanded. Conventionally, one-side drifting is considered to be caused by the so-called conicity in which the circumferential lengths of the belt layer in the right and left sides in a tyre are diferent from each other. Therefore, various methods have been taken in order to improve the homogeneity in the right and left directions of the tire's axis.

On the other hand, due to the recent progress in tire measurement techniques, as shown schematically in FIG. 9, a cornering force, i.e. a lateral force F which is generated in the lateral direction Y of a tire when a tiny slip angle ($\alpha$) is given in the running direction X of the tire and a self-aligning torque SAT which revolves in the direction of the slip angle ($\alpha$) about the vertical axis Z that passes the center of a tire can be measured at a high precision.

Such measurement results are shown using curve K in FIG. 10, by plotting the self-aligning torque SAT on the abscissa axis and the lateral torque F on the ordinate axis. In the curve K, the cases when the slip angle ($\alpha$) in 0 deg., +0.1 deg. or −0.1 deg. are shown with a dot.

In such relation of self-aligning torque SAT and lateral force F, the lateral force F at the crossing point K1 of the curve K and the axis of ordinates, that is, the lateral force P when the self-aligning torque SAT is not generated, is called a residue CF. It was found that the residue CF is a tire characateristic which affects the one-side drifting of a car. In other words, a car is drifted to one side in the right direction when the residue CF is in the plus direction, i.e. the right direction. Thus, the one-side drifting characteristic of a car can be evaluated by the direction and the size of the residue CF. In order to prevent the one-side drifting of a car, it is required to reduce the residue CF.

The residue CF is generated from the expansion and contraction of the belt at the ground contact part. A shearing strain in a surface is created in the cross ply belt of a radial tire by the parallel movement of the cords due to the expansion and contraction. Thus, the thread rubber generates a steering torque by a shearing strain in a surface generated together with the strain of the belt ply in the outermost layer. It is considered that the lateral force F is created by this steering torque. Thus, it was found that the residue CF is caused by a belt and depends on the cord quantity of the belt and the inclination of the belt cords.

The cord quantity is defined as N×S, which is the product (in mm$^2$) of the total cross-sectional area of one belt cord S (sq.mm) and the number of belt cords N laid in 10 cm in a right-angled direction to the belt cords. In other words, the cord quantity is the total cross-sectional area (mm$^2$) of the belt cords N per 10 cm width of the belt ply. The rigidity of the belt can be reduced by reducing the cord quantity N×S and enlarging the inclination angle of the cords to the direction of the tire's equator. It is known that this reduces the hooping effect of the belt and then the residue CF, thereby controlling the one-side drifting of a car.

On the other hand, such reduction of the rigidity of the belt can improve the comfortable riding performance at the same time, which is a basic item required for a car.

Additional experiments were conducted about the reduction of the residue CF in a tread part having a relatively low belt rigidity. As a result, it was found that good results could be obtained by reducing the inclination of the lateral grooves crossing the circumferential grooves, that is, constructing the lateral grooves closely in the direction of the tire's axis. However, such a tread pattern does not appeal to customers, because it lacks an aesthetic sense, and tends to decrease the marketability of the product.

SUMMARY OF THE INVENTION

It is hence a primary object of the first and the second embodiments of the present invention to present a pneumatic radial tire which prevents one-side drifting of a car when driving, improves the straight forward driving performance and helps to improve the aesthetic sense.

However, by reducing the belt cord quantity and enlarging the inclination angle to the direction of the tire's equator, the hooping effect is reduced and the cornering force decreases, especially upon turing, thus impeding the steering stability.

It is hence a primary object of the third, fourth and fifth embodiments of present invention to present a pneumatic radial tire which prevents one-side drifting of a car when driving, improves the straight forward driving performance and reduces the deterioration of steering stability.

In the first and second embodiments of the present invention as described above, by setting the inclination angle of lateral grooves to the direction of tire's axis at a small angle, the residue CF can be reduced in a tire. However, in order to increase the product appeal and the marketability of a tire, its tread pattern must follow the aesthetic sense of customers. But, a pattern of lateral grooves extending in the direction of tire's axis is mainly perceived to lack powerfulness. Therefore, in order to increase the perceived powerfulness, the inclination should be larger, but on the other hand, a larger inclination accompanies an increase of the residue CF. Therefore, it is required to meet these contradictory requirements.

Consequently, in the first embodiment of the invention, an increase of the residue CF is prevented and an image of the pattern can be improved by constructing approximately symmetrical lateral grooves in a V shape in at least one outside area and inside area in a tread part divided in the direction of tire's axis approximately into four equal areas which are left inside area CL, right inside area CR (combined and called an inside area C), left outside area SL and right outside area SR (combined and called an outside area S), with a difference of inclination angles (|Θ1|−|Θ2|) of 5 deg. or less, and thus, offsetting the effects of the lateral grooves in inside and outside areas.

In the second embodiment an increase of the residue CF is prevented and an image of the pattern can be improved by constructing approximately symmetrical horizontal grooves in a reverse V shape in the right and left outside areas SL and SR, or the right and left inside areas CL and CR, of which inclination angles (ΘsL, ΘsR), or (ΘcL, ΘcR) are approximately equal, for example, the difference (|ΘsL−ΘsR|), or the difference (|ΘcL|− |ΘcR|) is 5 deg. or less, and thus offsetting the effects of the lateral grooves in the right and left inside areas, or the right and left outside areas.

In addition to the above, in the first and second embodiments, by setting the cord quantity NS at 15.0 mm$^2$ or less and the inclination of the belt cords at 21 deg. or more, the rigidity of the belt can be reduced and the riding comfort can be improved.

In order to obtain a compatibility of the steering stability with the one-side drifting performance of a car, the present inventors further continued various studies. A conventional pneumatic radial tire for passenger cars has rows of blocks formed by crossing the lateral grooves in a rib sectioned by plural circumferential grooves having a linear or zigzag shape which extend in a circumferential direction.

As a result of the studies, it was found that the contribution rating of these lateral grooves to the cornering performance of a tire is small, and therefore, they hardly affect the steering stability.

Moreover, it was also found from the examination that the residue CF is reduced by forming the outer lateral grooves constructed in the right and left outside area S in a reverse direction to the outside belt cords which are the belt cords of the outermost belt ply and with an inclination of 0 to 40 deg. to the direction of tire's axis.

Prototypes of tires SA, SB and SC having outer lateral grooves Gs in the outside area S in different directions were produced for this examination as shown in FIGS. 11(a) to (c). Outside belt cords 7a of the outermost belt ply are shown by single-dotted broken lines in the figures. In FIG. 11(a), the outer lateral grooves Gs are inclined in the same direction as the outside belt cords 7a. In FIG. 11(b), they are formed in the direction of tire's axis. In FIG. 11(c), they are formed in the reverse direction. The results of measuring the residue CF in such patterns as SA, SB and SC are shown in FIG. 13. In the patterns SA, SB and SC, the residue CFs are −14.4 kg, −7.8 kg and −3.6 kg, respectively. Thus, it is known the residue CF of the pattern SC in which the outer lateral grooves Cs are constructed in a different direction to the outside belt cords 7a is reduced.

FIG. 13 shows the residue CF in the cases of pattern CA, CB and CC. In the case of pattern CA, the inner lateral grooves Gc are inclined in the same direction as the outside belt cords 7a in the inside area C, as shown in FIGS. 12(a), FIGS. 12(b) and (c) show the pattern CB in which they are inclined in the direction of tire's axis and the pattern CC in which they are inclined in the reverse direction, respectively. The residue CFs are −5.9 kg, −8.1 kg and −12.1 kg, respectively. The absolute value of the residue CF was reduced by inclining the inner lateral grooves in the same direction as the outside belt cords 7a.

Thus, it was found that the residue CF can be reduced and the one-side drifting performance of a car can be improved by inclining the lateral grooves in the reverse direction to the outside belt cords 7a in the outside area S and in the same direction in the inside area C.

Therefore, in the third embodiment outer horizontal grooves Gs constructed in the outside area S are inclined in a different direction to the outside belt cords 7a and at 0 to 40 deg. to the direction of tire's axis.

In addition, in the third invention, lateral grooves are inclined in the same direction as the outside belt cords 7a and at an angle of 40 deg. or less to the direction of tire's axis in the inside area C.

The following description relates to the fourth embodiment.

In the case that inner lateral grooves Gc having a larger inclination are constructed in the inside area C, the cornering force upon turing of a tire generated especially when the slip angle (α) is 1 deg. tends to reduced. Therefore, in some cases, it is not preferable to form inner horizontal grooves Gc having a larger inclination angle.

Thus, it is required to impose the reducing effect of the residue CF caused by the inside area C on the outside area S. For this purpose, the present inventors produced prototypes of tires having different circumferential pitches Ps in a direction of the tire's equator between the outer lateral grooves Gs in the outside area S as shown in FIG. 26, and the results of measuring the residue CF are shown in FIG. 27.

From the results, it was found that the residue CF can be controlled by 6 kg or less in absolute value by setting the circumferential pitch Ps at 20 mm or less. Thus the cornering force generated when the slip angle (α) is 1 deg. can be larger and the steering stability upon turing can be improved without relying upon the inner lateral grooves Gc of the inside area C.

Thus, the circumferential pitch Ps is set at 20 mm or less in the fourth invention.

The next description relates to the fifth embodiment.

As priorly described, by constructing lateral grooves Gs in the outside area S in a different direction to the outside belt cords 7a, the residue CF can be reduced, and the larger the inclination angle Cs is, the further the residue CF can be reduced.

However, it was found that in the case that the inclination (Θs) is set at a larger angle, the noise generated by the tread pattern becomes larger on the other aspect. Therefore, when a noise characteristic is considered to be important, the inclination angle (Θs) of the outer horizontal grooves Gs is limited.

Therefore, a controlling method of the residue CF was further studied. The residue CF was measured by changing the maximum length L in a right-angled direction to lateral grooves Gc of a block B formed by the inner lateral grooves Gc formed in a middle area M, dividing the tread part shown in FIG. 32 into three equal areas. As known from the results shown in FIG. 34, it was found that the residue CF is reduced by reducing the maximum length L gradually. Furthermore, by setting the maximum length L at 10 mm or less, the absolute value of the residue CF can be set at 5 kg or less.

Thus, the maximum length L of the block B in the middle area M was set at 10 mm or less in the fifth embodiment.

By this setting, the straight-forward driving stability can be improved without affecting the steering stability or noise characteristic.

Moreover, in the third, fourth and fifth embodiments, this can be preferably adopted in a tire having a belt which brings about a strong hooping effect and improves the steering stability, wherein the cord quantity NS is 18.0 mm$^2$ or more and the inclination of the belt cords to the tire's equator is 18 deg. or less.

BRIEF DESCRIPTION OF THE DRAWINGS

Referring now to the drawings, the embodiments of the present invention are described in detail below, in which:

FIGS. 11(a) to (c) and 12(a) to (c) are plan views showing patterns used in the experiments, respectively, FIG. 13 is a diagram showing the experimental results of the patterns shown in FIGS. 11(a) to (c) and FIGS. 12(a) to (c)

DETAILED DESCRIPTION OF THE INVENTION

Figure 1:
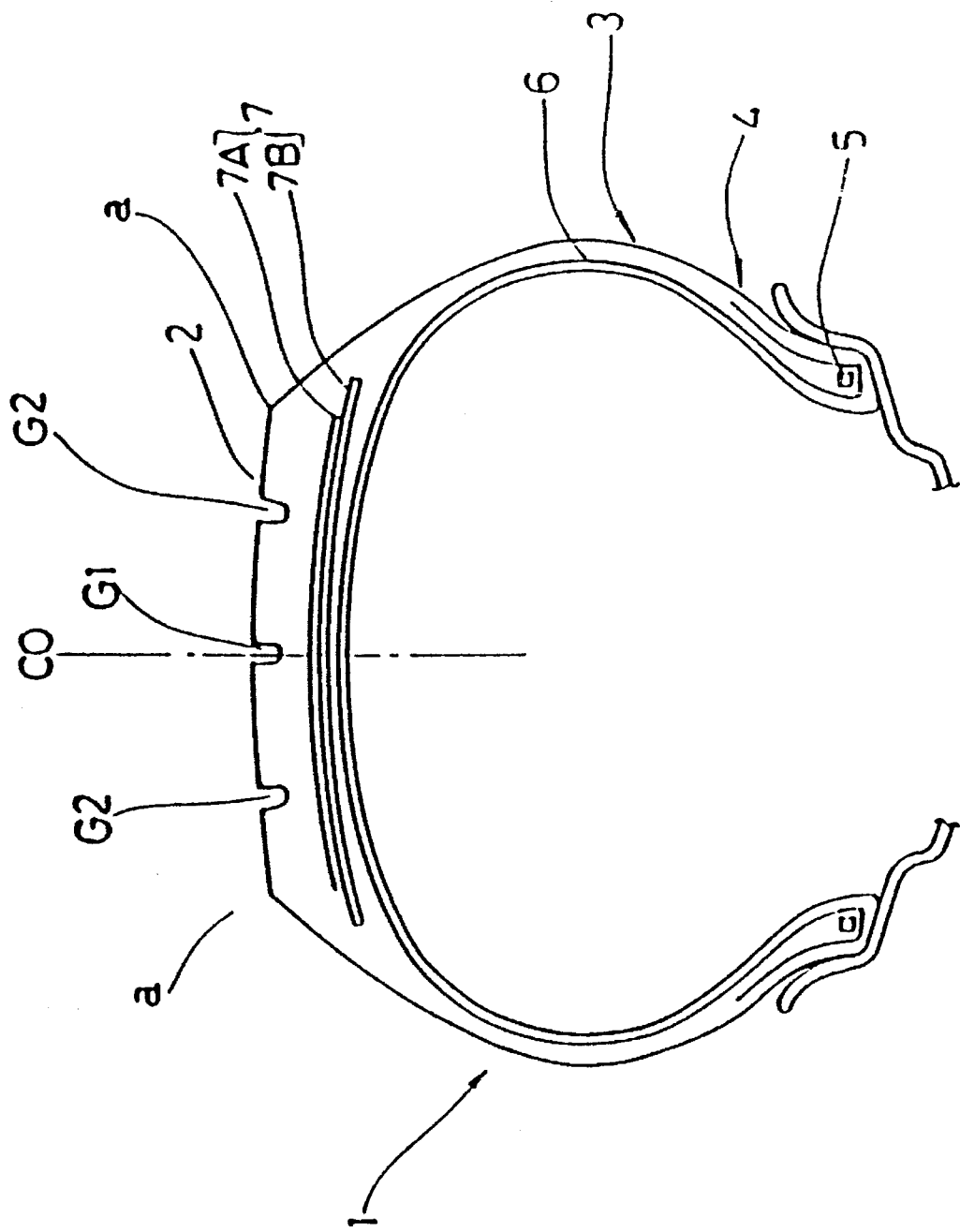
FIG. 1 is a sectional view showing one of the embodiments of the first invention.
Figure 2:
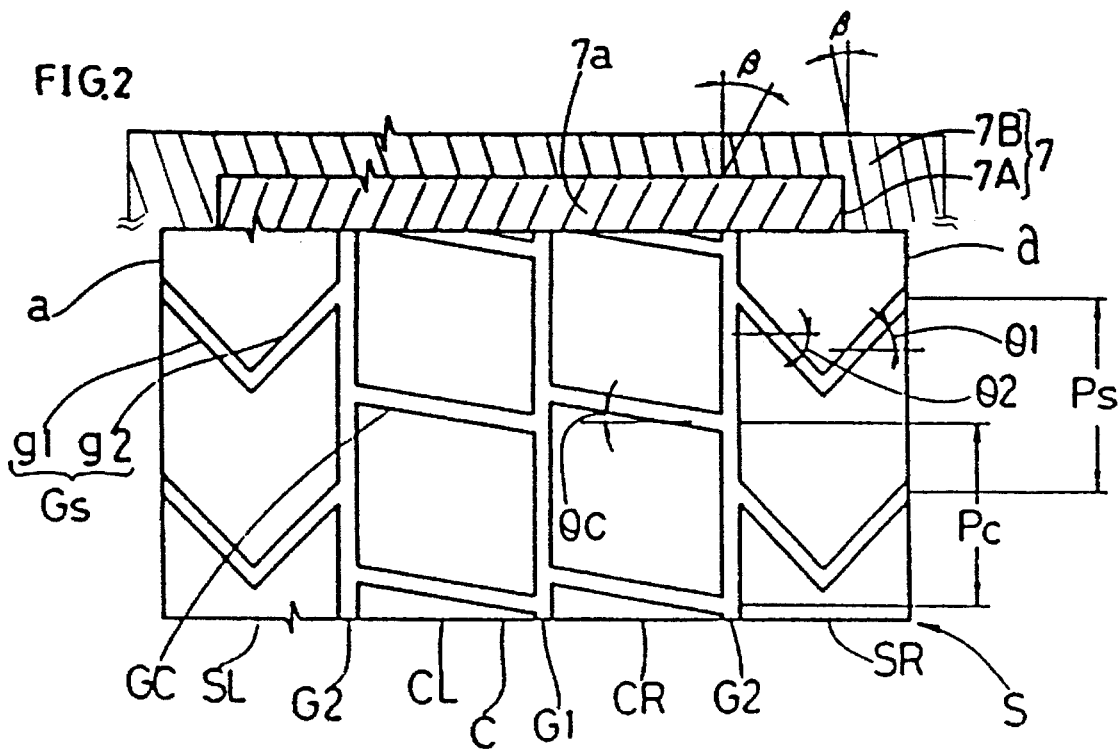
FIG. 2 is a plan view showing one example of a tread pattern of the embodiment of FIG. 1, FIGS. 3 to 6 are plan views showing other tread patterns, of the embodiment of FIG. 1, respectively.

In FIGS. 1 and 2, a pneumatic radial tire 1 of the first invention comprises a carcass 6 extending from a tread part 2 through a side-wall part 3 to a bead part 4 and wrapped around a bead core 5, and a belt 7 placed outside in the radial direction of the carcass 6 and inside the tread part 2.

Figure 8:
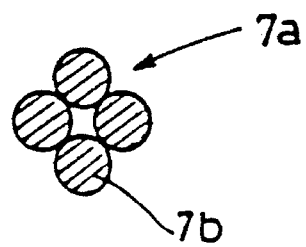
FIG. 8 is a sectional view showing an example of a belt cord.
Figure 9:
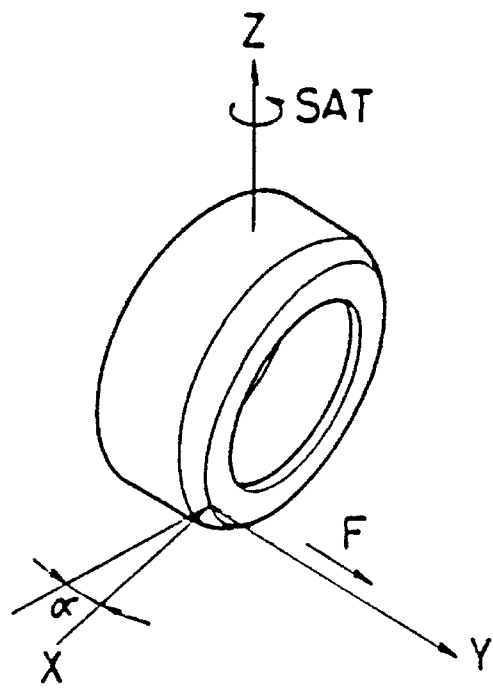
FIG. 9 is a perspective view explaining the residue CF.
Figure 10:
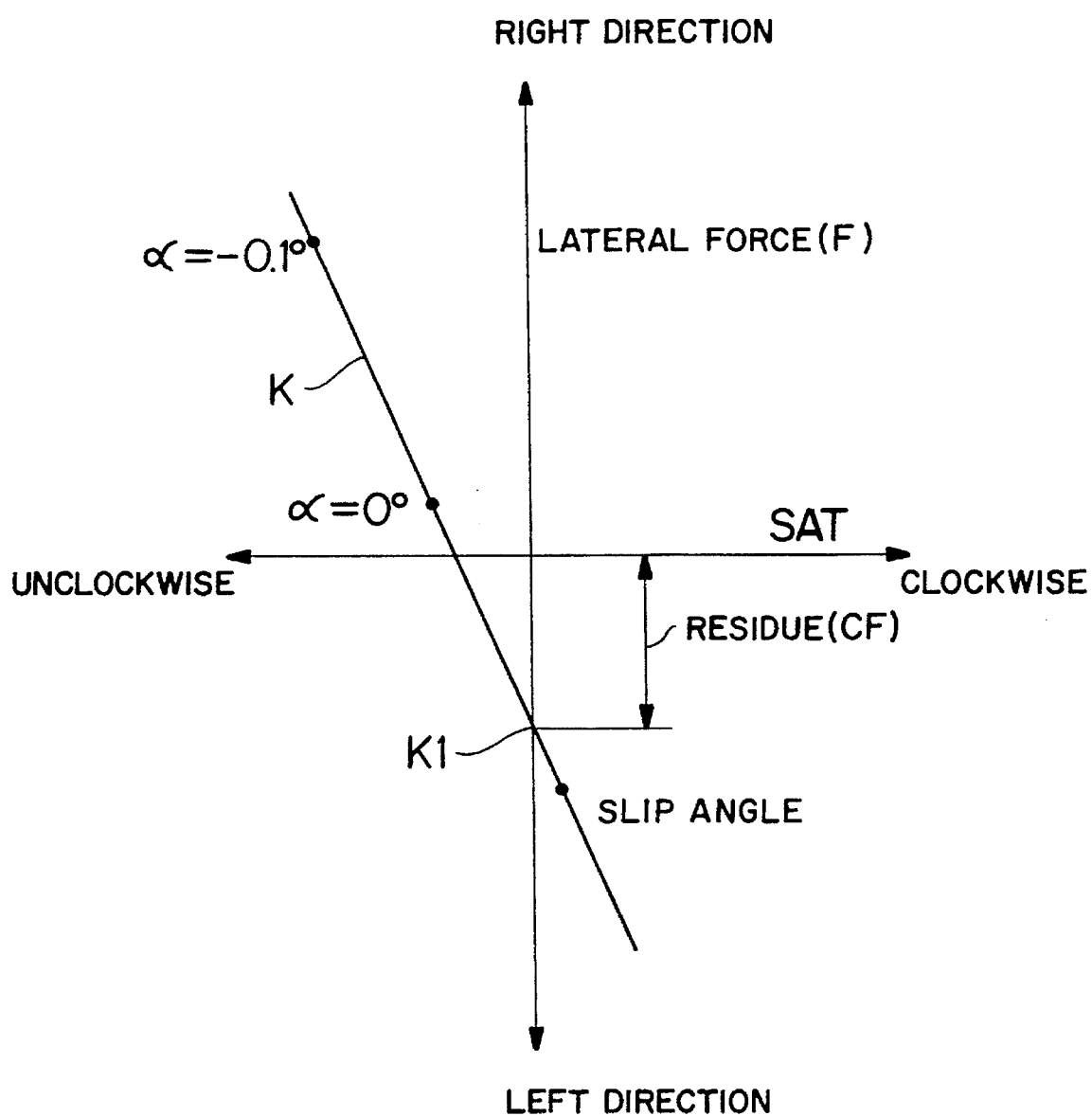
FIG. 10 is a diagram of the residue CF of FIG. 9.

The belt 7 comprises belt plies 7A and 7B of two inside and outside layers which are inclined in mutually reverse directions at an inclination angle (β) of 21 deg. or more to the tire's equator CO of the belt cords. The belt ply cords 7a radially outer belt ply 7B in the embodiment are inclined in a right upper direction to the tire's equator CO in FIG. 2. As belt cords, as shown for example in FIG. 8, twisted steel filaments 7b of 2+7× 0.22, 1×5×0.23 or 1×4×0.22, the last numeral being in mm² units, 31, for example, are used.

Figure 7:
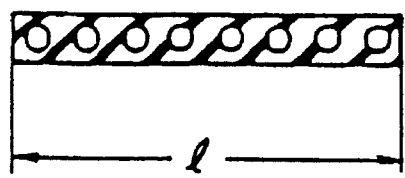
FIG. 7 is a sectional view of a belt ply.

The cord quantity NS which is the product of a total cross-sectional area S (sq.mm) of one cord, that is, a sum of a cross-sectional area of the filament 7b of the belt cords and the number of cords N in a distance 1 of 10 cm in FIG. 7 is at 15.0 mm² or less, thereby the rigidity of the belt 7 being reduced and the comfortable riding performance being improved.

In FIG. 2, the tread part 2 is virtually sectioned in the direction of tire's axis into a left inside area CL and a right inside area CR of both sides of the direction of the tire's equator CO, a left outside area SL and a right outside area SR that extend to the edges a of the tread part. In the embodiment, outer lateral grooves Gs comprising an outer groove part g1 with an inclination angle (Θ1) of 45 deg. or less to the direction of tire's axis and on outer groove part g2 inclined reversely to the outer groove part g1 at an angle (Θ2) and forming a V shape with the outer groove part g1 are constructed in the right and left outside area S. The difference of the inclination (Θ1) and (Θ2) of the outer groove part g1 and the inner groove part g2, (|Θ1|–|Θ2|) is set at 5 deg. or less.

Thus, the outer lateral grooves Gs are about symmetrical in a direction of tire's axis, and the effect of the residue CF by inclinations is reduced. This also improves the appearance of a tire. In addition, in the right and left inside area C, inner lateral grooves Gc inclining in right lower direction at an inclination angle (Θc) of 5 deg. or less to the direction of tire's axis are provided.

(f an inclination angle (Θ1,Θ2) of the outer lateral grooves Gs exceeds 45 deg., a pattern noise tends to be caused.

In this embodiment, circumferential grooves G1 and G2 are constructed continuously in the direction of tire's equator CO along the tire's equator CO sectioning the right and left inside area C and at the middle position between the tire's equator CO and the edge of the tread part 2, sectioning the right and left inside area C and the right and left outside area S. The circumferential grooves G (generally called the grooves G1, G2) may be linear grooves or zigzag grooves.

Circumferential pitches Ps and Pc which are the distances between the outer and inner grooves Gs and Gc in the direction of tire's equator are both set at 40 mm or less, preferably 20 mm or less.

Figure 3:
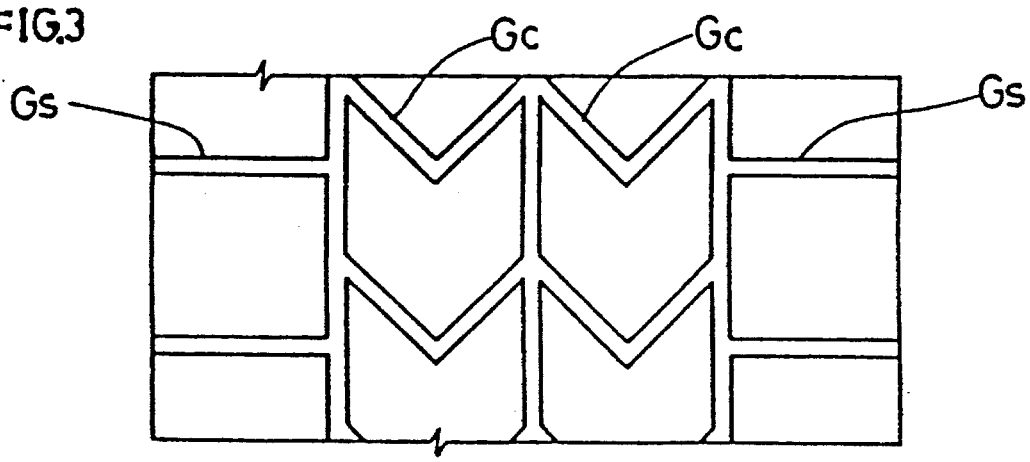
Figure 4:
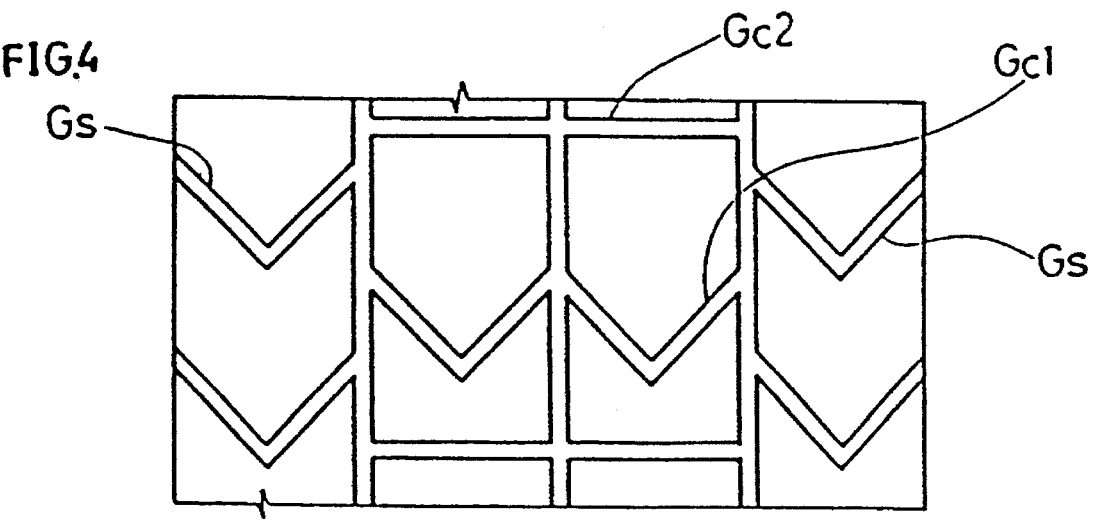

FIG. 3 shows a case where the inner circumferential groove Gc in the inside area C is formed in a V shape. FIG. 4 shows an example in which the outer groove Gs is formed in a V shape and a groove Gc2 extending in the direction of tire's axis and a V-shaped groove Gc1 are reciprocally formed in the inside area C. A V-shaped horizontal groove may be formed in an inside area Gc or only in an outside area Gs.

Figure 5:
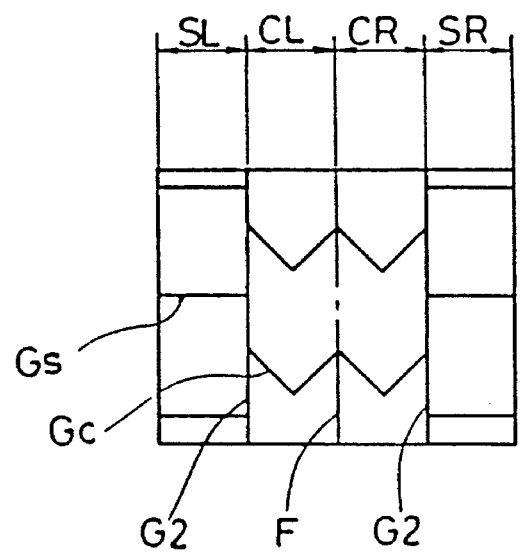
Figure 6:
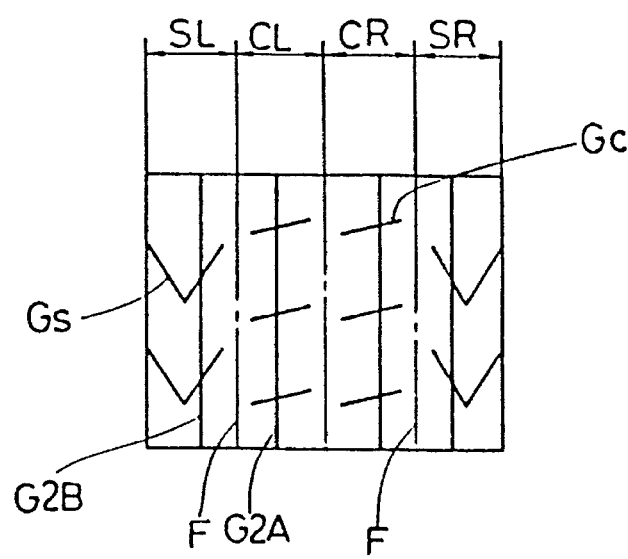

FIGS. 2 to 4 show cases where main grooves G1 and G2 are constructed respectively in the parts that section the inside area C and the outside area S, while in the case that two main grooves C2 and G2 are employed, as shown in FIG. 5, or in the case that four or more grooves G2A, and G2B are employed at a regular interval, as shown in FIG. 6, the inside area C and the outside area S are considered to be sectioned by a virtual line F on the rib. At least one end of the inner lateral groove Gc must open to the circumferential or main grooves G.

Figure 14:
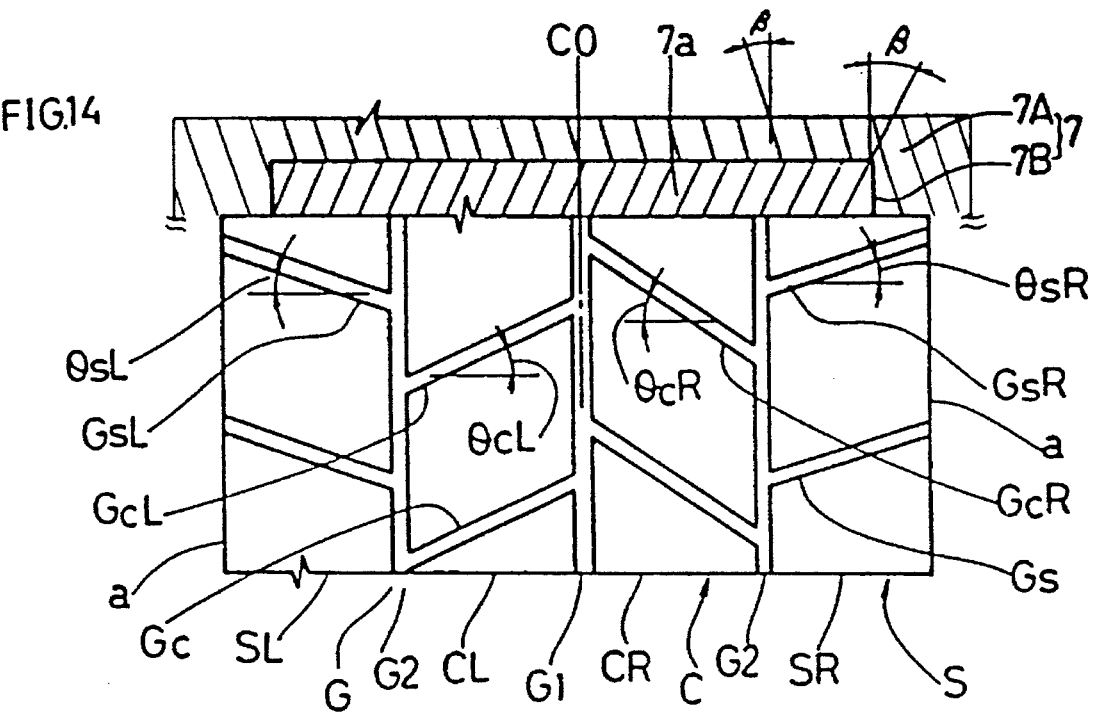
FIG. 14 is a plan view showing the tread pattern of one of the embodiments of the second invention.

One of the embodiments of the second invention is shown in FIG. 1 and 14. Explanations about the similar or same composition as explained in the foregoing first embodiment are omitted. The third, fourth and fifth embodiments hereinafter are treated in the same manner.

In the right and left outside area S, approximately symmetrical outer lateral grooves GsL and GsR (generally called outer lateral grooves Gs) are separately constructed with reverse inclinations of (ΘsL) and (ΘsR) of approximately 20 deg. to the direction of tire's axis in the direction of tire's equator CO.

In addition, in the embodiment, approximately symmetrical inner lateral grooves GcL and GcR (generally called inner lateral grooves Gc) are separately constructed in the right and left inside area C as well with reverse inclinations of (ΘcL) and (Θ cR) of approximately 30 deg. to the direction of tire's axis.

The differences of the inclination angles (|ΘsL|–|ΘsR|) and (|ΘcL|–|ΘcR|) should be set at 5 deg. or less.

Thus, the lateral grooves Gs and Gc are symmetrical in the direction of tire's equator CO and the effect of the residue CF by inclinations is reduced. The appearance is also improved.

In the inclinations (ΘsL), (ΘsR), (ΘcL) and (ΘcR) of the outer lateral grooves Gs and Gc exceed 45 deg., a pattern noise tends to be generated.

Circumferential pitches Ps and Pc which are the distances between the outer and inner lateral grooves Cs and Gc in the direction of tire's equator are both set at 40 mm or less, preferably at 20 mm or less.

Figure 15:
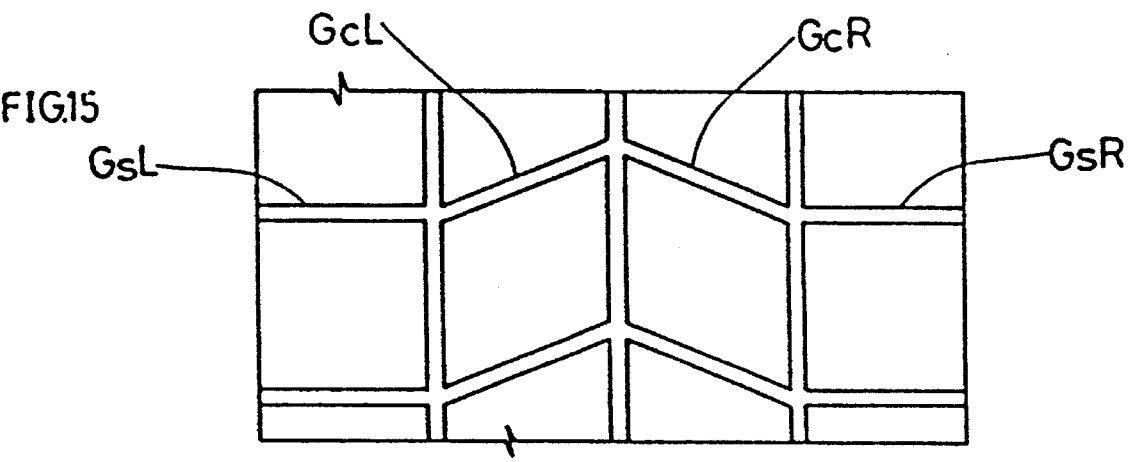
FIGS. 15 to 18 are plan views showing other tread patterns, respectively, of the embodiment of FIG. 14.
Figure 16:
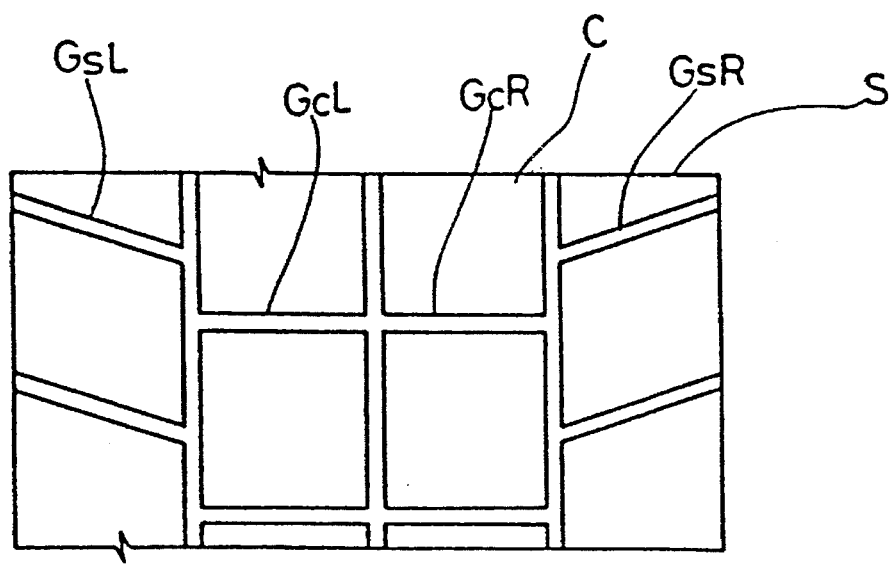

FIG. 15 shows the other embodiment in which the inner lateral grooves Gc of the inside area C are formed in a reverse V shape and outer lateral grooves Ga extend in the direction of the tire's axis FIG. 16 shows still another embodiment in which the outer lateral grooves Gs are formed in a reverse V shape and inner lateral grooves Gc extend in the direction of tire's axis.

Figure 17:
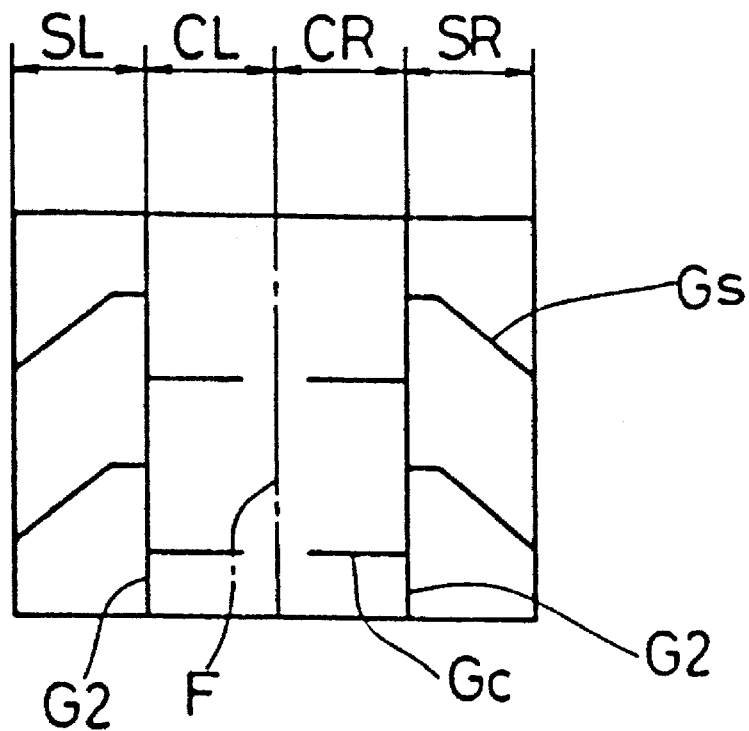
Figure 18:
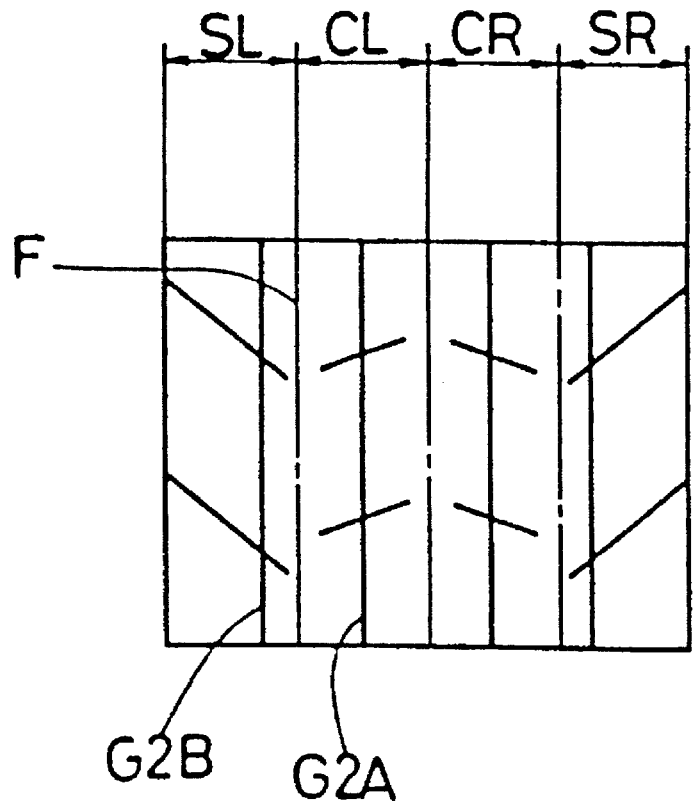

FIGS. 14 to 16 show cases where main grooves G1 and G2 are constructed respectively in the parts that section the inside area C and the outside area S, while in the case that two main grooves G2 and G2 are employed, as shown in FIG. 17, or in the case that four or more grooves G2A, and G2B are employed at a regular interval, as shown in FIG. 18, the inside area C and the outside area S are considered to be sectioned by a virtual line F on the rib. At least one end of the inner circumferential groove Gc must open to the main grooves G.

Figure 19:
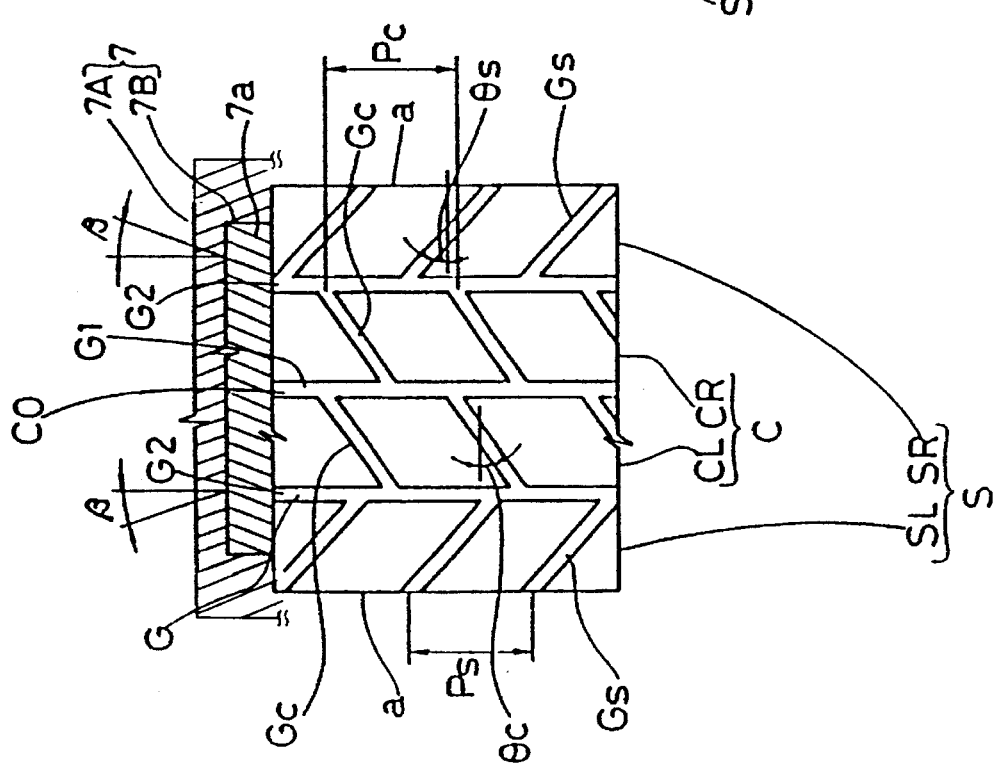
FIG. 19 is a plan view showing the tread pattern of one of the embodiments of the third invention.

One of the embodiments of the third embodiment is shown in FIG. 1 and FIG. 19.

In the right and left outside area S, outer lateral grooves Gs with an inclination angle (Θs) of 40 deg. or less to the direction of tire's axis which is reverse to the inclination of the outside belt cords 7a are constructed at spacings in the direction of tire's equator CO. In the right and left inside area C, inner lateral grooves Gc with an inclination angle (Θc) of 40 deg. or less to the direction of tire's axis inclined in the right upper direction same as the outside belt cords 7a are constructed. If the inclination exceeds the inclination angle (Θs) of the outer lateral grooves Cs, a pattern noise tends to be generated. In the case that the inclination (Θc) of the inner horizontal grooves Gc exceeds 40 deg., the cornering force upon turning tends to be reduced, and the steering stability tends to be deteriorated.

Circumferential pitches Ps and Pc which are the distances between the outer and inner grooves Gs and Gc in the direction of tire's equator are set at 40 mm or less respectively, preferably at 20 mm or less.

It was described previously that the residue CF can be improved by constructing outer grooves Gs reversely inclined to the outside belt cords 7a in the right and left outside area S, and inner grooves Gc inclined to the same direction in the right and left inside area C. It is confirmed that the residue CF can be further reduced by setting the circumferential pitches Pc and Ps preferably at 20 mm or less.

Figure 20:
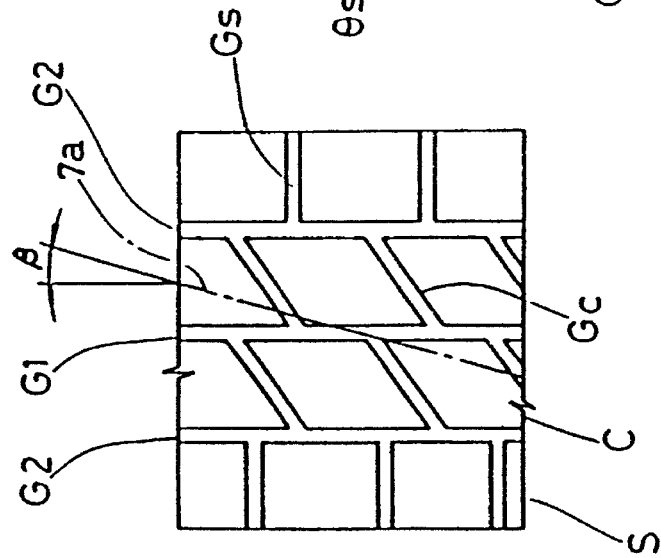
FIG. 20 is a plan view showing an example of another tread pattern of the embodiment of FIG. 20, FIGS. 21 to 23 are plan views showing other tread patterns, respectively of the embodiment of FIG. 20.

FIG. 20 shows the other embodiment where the inclination angle (Θs) of the outer grooves Gs is set at 0

FIGS. 19, 20 show cases where main grooves G1 and G2 are constructed respectively in the parts that section the inside area C and the outside area S, while in the case that two main grooves G2 and G2 are employed, as shown in FIG. 21, or in the case that four or more grooves G2A, and G2A re employed at a regular interval, as shown in FIGS. 22 and 23, the inside area C and the outside area S are considered to be sectioned by a virtual line F on the rib. At least one end of the inner lateral groove Gc must open to the circumferential or main grooves G. As a belt cord, the same material as used in the first embodiment can be employed. However, by setting the cord quantity N S at 18.0 mm² or more, the hooping effect by the belt 7 is increased, and thus, the steering stability is improved. It is the same in the fourth and fifth embodiments well.

Figure 25:
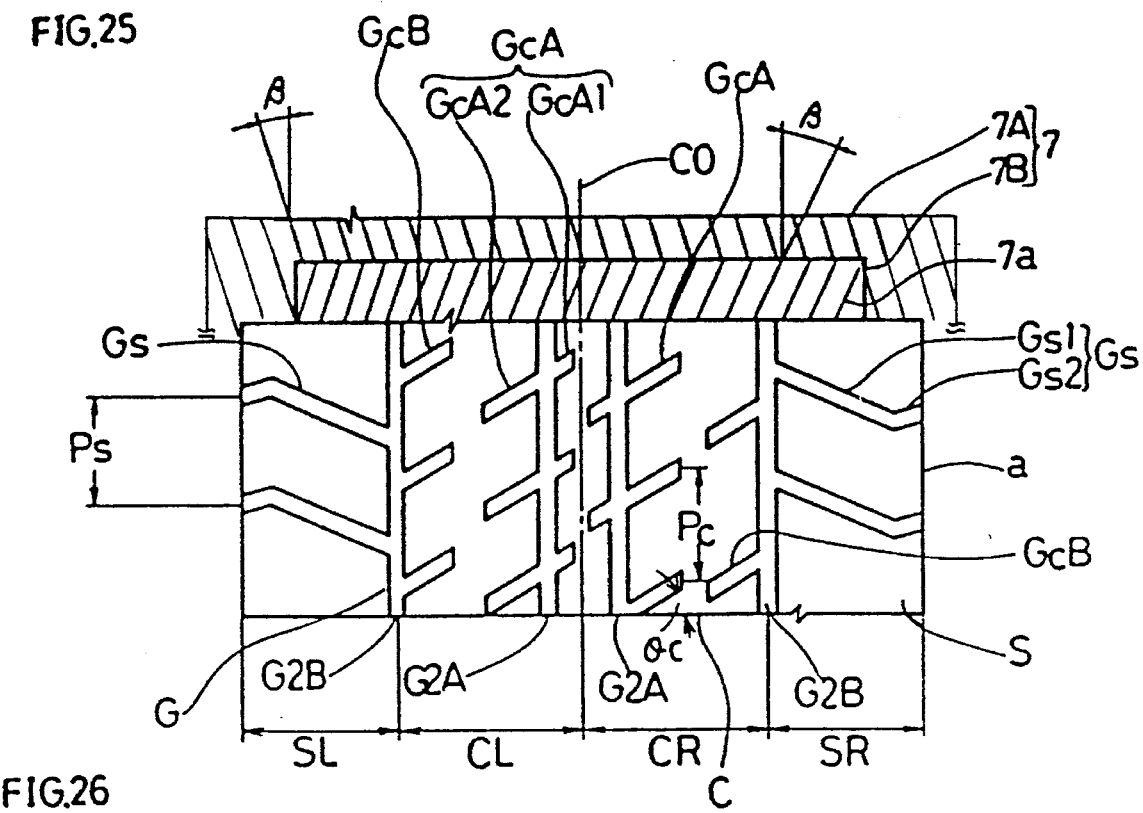
FIG. 25 is a plan view showing the tread pattern of one of the embodiments of the fourth invention.
Figure 26:
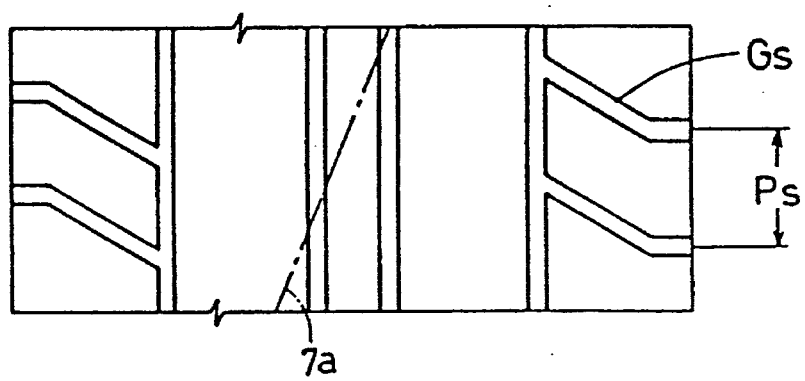
FIG. 26 is a plan view showing an example of another tread pattern of the embodiment of FIG. 26.
Figure 27:
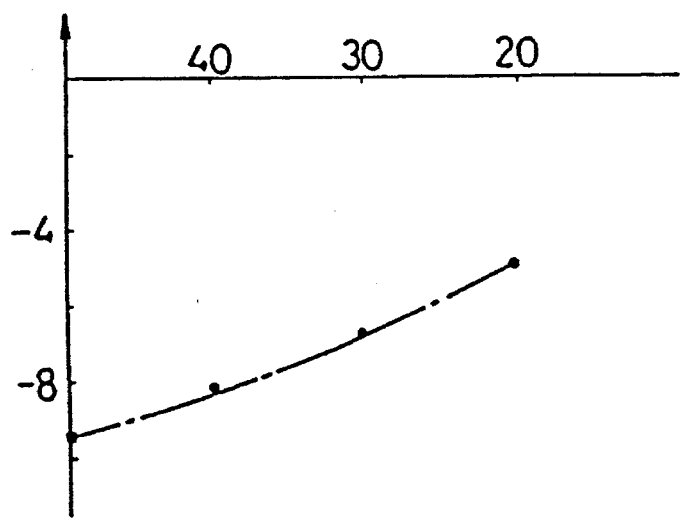
FIG. 27 is a diagram showing an example of the results of test.

One of the embodiments of the fourth invention is shown in FIGS. 1 and 25.

In the right and left outside area S, outer lateral grooves Gs are constructed in the direction of tire's equator with the main part Gs1 that has a length exceeding 70% of the outside area S in the direction of tire's axis. The main part Gs1 is inclined at an angle (Θs) of 40 deg. or less to the direction of tire's axis and reversely to the outside belt cords 7a. In the main part Gs1, a short sub-part Gs2 extending outward in the direction of tire's axis to the edges a of the tread part 2 is constructed. If the inclination angle (Θs) of the outer lateral grooves Gs exceeds 40 deg., a pattern noise tends to be generated.

In the tread part 2, main grooves G2A and G2A are formed on the both sides of the tire's equator CO, and other circumferential grooves G2B and G2B are also formed continuously in the direction of tire's equator in the parts that section the inside area C and the outside area S.

The vertical grooves G (generally called the circumferential grooves G) may be linear grooves or zigzag grooves.

In the inside area C, an inner grooves GcA comprising an inner groove part GcA1 extending inside from the main grooves G2A with the inner ends ending near the equator of the tire CO and an outer groove part GcA2 extending outside in the direction of tire's axis. Moreover, inner grooves GcB extending from the vertical groove G2B respectively to the inside direction of the tire are also constructed parallel in the direction of tire's circumference. The inner grooves GcA and GcB are both inclined in the same direction as the outside belt cords 7a. By setting the inclination angle (Θc) to the direction of the tire's axis at 35 deg. or less, the cornering force when the slip angle (α) is 1 deg. is prevented from deteriorating, and the steering stability upon turning is prevented from reducing.

The circumferential pitch Pc of the inner groove Gc is set at 40 mm or less, preferably at 20 mm or less. In addition, by setting the circumferential pitch Ps of the outer horizontal grooves Gs at 20 mm or less, the residue CF is reduced.

Figure 28:
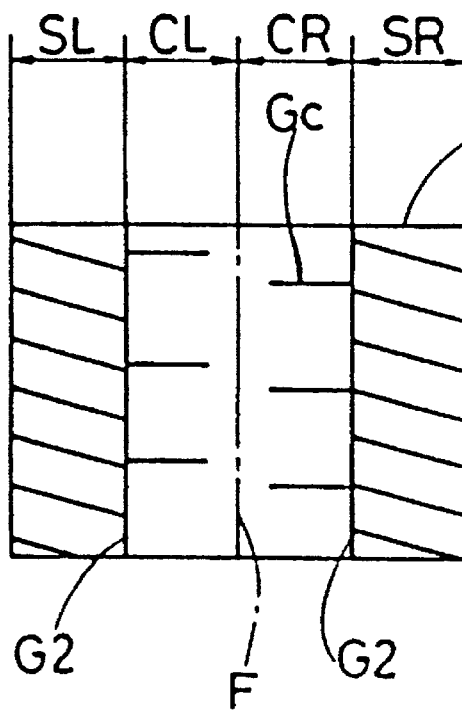
FIGS. 28 and 29 are plan views showing other tread pattern, respectively, of the embodiment of FIG. 25.
Figure 29:
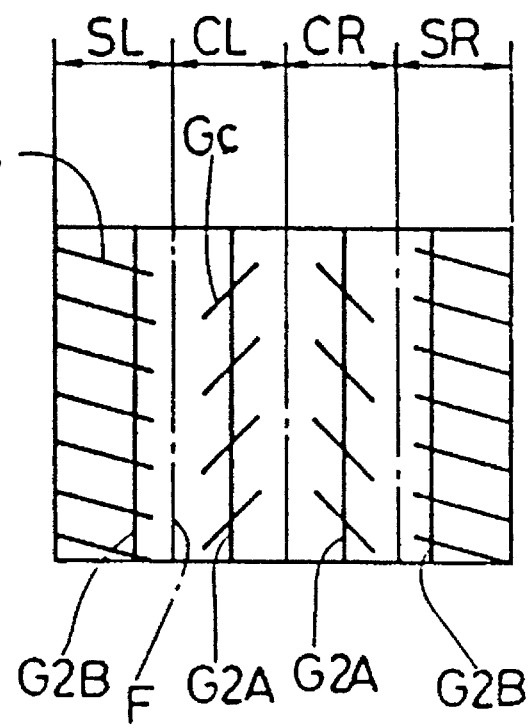

In the case that two main grooves G2 and G2 at a regular interval, as shown in FIG. 28, or four grooves G2A and G2B at a regular interval, as shown in FIG. 29, are employed, the inside area C and the outside area S are sectioned by a virtual line F on the rib. At least one end of the inner grooves Gc must open to the vertical grooves G, and at least one end of the outer grooves Gs must open at the edge a of the tread part or to the vertical grooves G.

Figure 31:
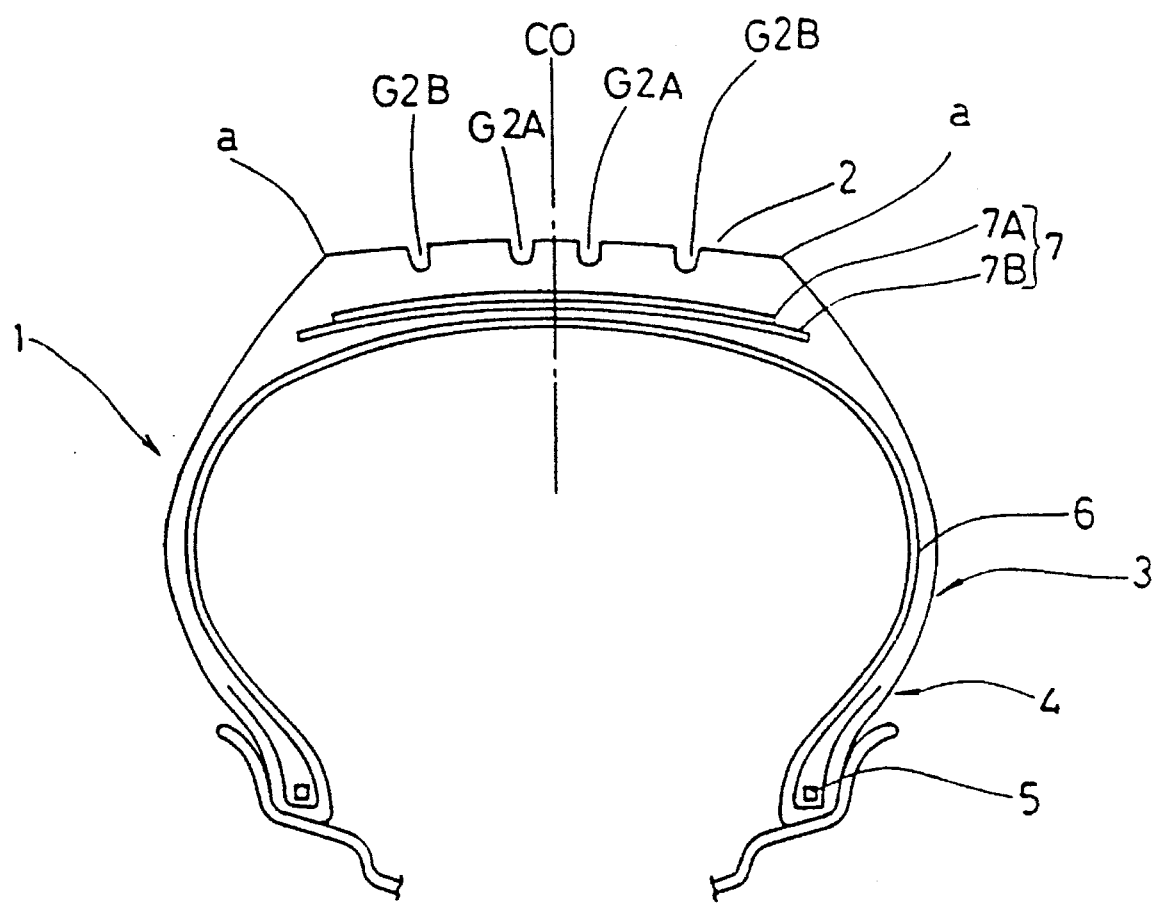
FIG. 31 is a sectional view showing one of the embodiments of the fifth invention.
Figure 32:
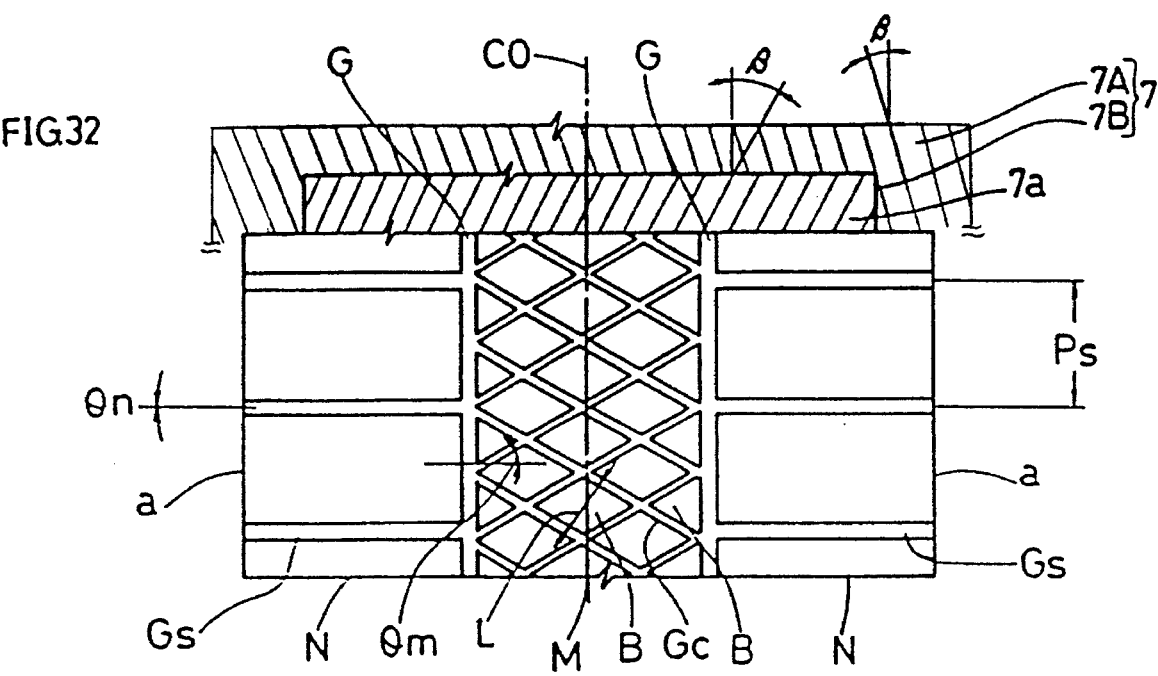
FIG. 32 is a plan view showing an example of a tread pattern for the embodiment of FIG. 31.

One of the embodiments of the fifth invention is shown in FIG. 31 and 32.

A tread part 2 is sectioned virtually in the direction of tire's axis into a middle area M including the tire's equator CO and outward areas N, N extending to the edge a of the tread part outside the middle part M. In the outward area N, outer grooves Gs are constructed at spacings in the direction of the tire's equator extending toward the direction of tire's axis with an inclination angle ($\Theta n$) of 0 deg. In the midde area M, inner grooves Gc with an inclination angle ($\Theta m$) of 45 deg. or less to the direction of tire's axis are constructed. In the embodiment, the inner grooves Gc are small grooves of 0.5 to 3 mm in width, and the inner grooves Gc from a crossing groove mutually inclined in reverse directions at approximately 40 deg. to the direction of tire's axis. Therefore, in the middle area M, multiple rhombic blocks B are formed in an oblique latticed shape. The maximum length L of the block B in a right-angled direction to the groove Gc is set at 10 mm or less.

In addition, in the embodiment, grooves G, G are continuously constructed in the direction of tire's equator in the position to section the middle area M and the outward area N into approximately three equal areas. The grooves G may be linear grooves or zigzag grooves.

The circumferential pitch Ps which is the distances between the outer horizontal grooves Gs in the direction of tire's equator is set at 40 mm or less, preferably at 20 mm or less.

By setting the length of the block B in the middle area M in a right-angled direction to the inner horizontal grooves Gc at 10 mm or less, even when the outer grooves Gs extending in the direction of tire's axis in the outward area N are constructed to control pattern noises, the residue CP can be reduced as mentioned before.

Figure 33:
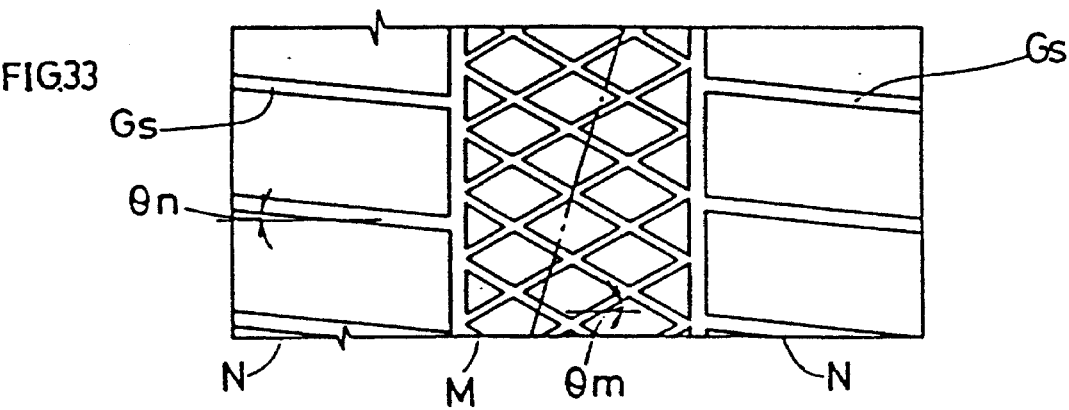
FIG. 33 is a plan view showing an example of the other pattern.
Figure 34:
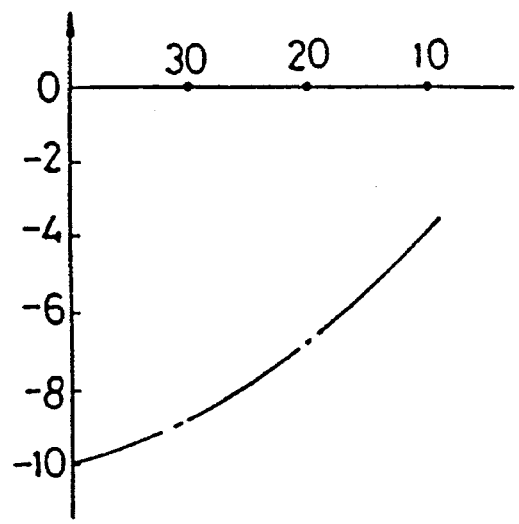
FIG. 34 is a diagram showing an example of the test.

However, the outer grooves Gs are not so limited, and, as shown in FIG. 33, they may be inclined in the direction of tire's axis at an angle ($\Theta n$) of such a range that does not increase pattern noises, for example, 15 deg. or less, preferably 10 deg. or less, and more preferably 5 deg. or less.

Figure 35:
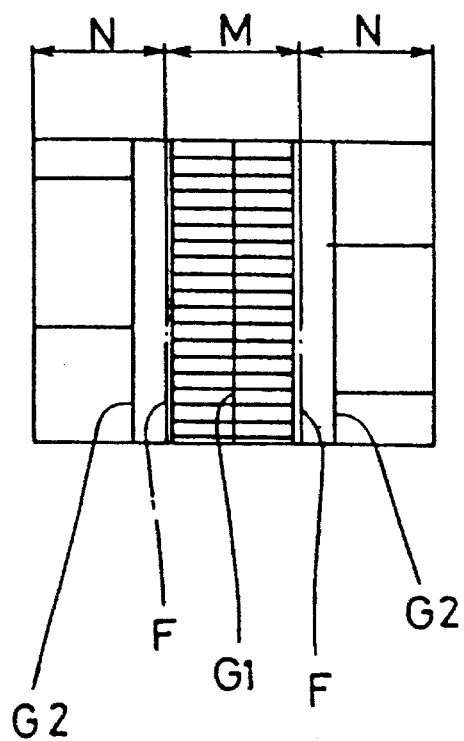
FIGS. 35 and 36 are plan views showing other patterns, respectively.
Figure 36:
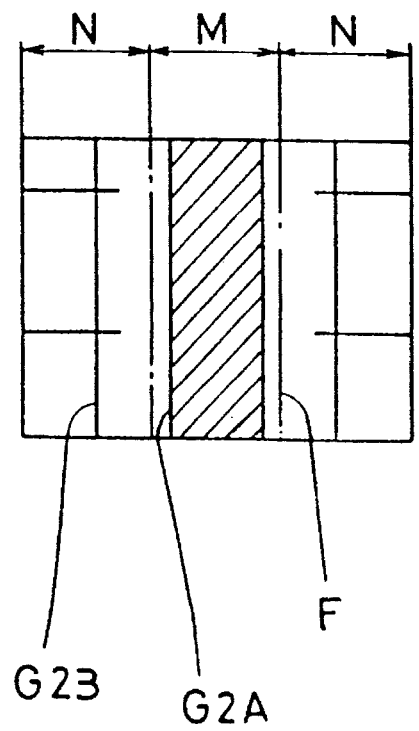

FIGS. 32 and 33 show a case where vertical grooves G are respectively constructed in the parts that section the middle area M and the outward area N, while three vertical grooves G1, G2 and G2 may be employed, as shown in FIG. 35, or four grooves G2A and G2B may be employed at a regular interval, as shown in FIG. 36. In these cases, the middle area M and the outward area N are sectioned by a virtual line F on the rib, inner horizontal grooves Gc may be formed not in a latticed shape but also as grooves parallel with the direction of the tire's axis or inclined and not mutually crossing, as shown in FIGS. 35 and 36.

EXAMPLES

A prototype of tire having a tire size of 175/70R13 was produced, and the riding comfort and the residue CF were measured. As belt cords, steel cords of 1×4×0.22 in size were used. The belt was formed in two plies. The test was performed by mounting the tire on a rim 5J×13, setting the internal pressure at 2.0 kg/sq.cm. loading 300 kg and using a flat track machine prepared by MTS company, U.S.A. to measure the residue CF. The residue CF is shown by a residue CF index setting the index of the comparison example at 100 in Table 1 etc. The smaller the residue CF index is, the more preferable the result is. In regard to the riding comfort, by mounting the tire on a 2,000 cc passenger car, a feeling test was conducted by a driver, and an evaluation was made by setting the comparison example at 100 points. Higher scores show better riding comfort.

A: In regard to the first embodiment of the invention, a prototype of a tire as shown in Table 1, FIGS. 2 and 3 was produced. The results are also shown in the Table 1.

B: In regard to the second embodiment of the invention, a prototype of a tire as shown in Table 2. FIGS. 14, 15 and 16 was produced. The results are shown in the Table 2.

C: In regard to the third embodiment of the invention, a prototype of a tire as shown in Table 3, FIGS. 19 and 20 was produced. The results are also shown in the Table 3. As a comparative example, the other prototype having a pattern shown in FIG. 24 was also produced for the purpose of comparison.

D: In regard to the fourth embodiment of the invention, a prototype of a tire as shown in Table 4 and FIG. 25 was produced. As a comparative example, the other prototype having a pattern shown in FIG. 30 was also produced for the purpose of comparison, and the results are shown in the Table 4.

E: In regard to the fifth embodiment of the invention, a prototype of a tire as shown in Table 5 and FIG. 32 was produced. The results are shown in the Table 5. The noise characteristic was also evaluated through a feeding test by a driver and shown in degrees of noise. Higher scores mean more inferiority in noise characteristic.

Thus, the invention can improve the one-side drifting of a car without sacrificing the steering stability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Pattern | Em. 1-1 FIG.2 | Em. 1-2 FIG.2 | Em. 1-3 FIG.3 | Em. 1-4 FIG.3 | Co. 1-1 FIG.2 | Co. 1-2 FIG.2 | Co. 1-3 FIG.2 | Co. 1-4 FIG.2 | Co. 1-5 FIG.3 | Co. 1-6 FIG.3 |
| --- | --- | --- | --- | --- | --- | --- | --- | --- | --- | --- |
| Belt cord | | | | | | | | | | |
| N × S | 12.2 | 12.2 | 14.5 | 14.5 | 15.4 | 15.4 | 20.5 | 20.5 | 12.2 | 14.5 |
| Inclination angle | 21 | 25 | 21 | 25 | 21 | 18 | 21 | 18 | 21 | 21 |
| Lateral groove in V shape | | | | | | | | | | |
| Location | Outside area | Outside area | Inside area | Inside area | Outside area | Outside area | Outside area | Outside area | Inside area | Inside area |
| Inclination angle ($\theta 1$) | 35 | 35 | 35 | 35 | 30 | 30 | 20 | 20 | 30 | 20 |

TABLE 1-continued

| Pattern | Em. 1-1 FIG.2 | Em. 1-2 FIG.2 | Em. 1-3 FIG.3 | Em. 1-4 FIG.3 | Co. 1-1 FIG.2 | Co. 1-2 FIG.2 | Co. 1-3 FIG.2 | Co. 1-4 FIG.2 | Co. 1-5 FIG.3 | Co. 1-6 FIG.3 |
|---|---|---|---|---|---|---|---|---|---|---|
| Inclination angle ($\theta_2$) Inner lateral groove | 35 | 40 | 35 | 40 | 40 | 40 | 40 | 40 | 40 | 40 |
| Inclination angle ($\theta_c$) | 2.5 | 2.5 | | | 2.5 | 2.5 | 2.5 | 2.5 | | |
| Direction | Right lower | Right lower | — | — | Right lower | Right lower | Right lower | Right lower | — | — |
| Circumferential pitch Pc (mm) Outer lateral groove | 18 | 18 | | | 18 | 18 | 18 | 18 | | |
| Inclination angle ($\theta_s$) | | | 0 | 0 | | | | | 10 | 10 |
| Direction | — | — | Lateral | Lateral | — | — | — | — | Right upper | Right upper |
| Circumferential pitch Ps (mm) | | | 18 | 15 | | | | | 18 | 18 |
| Riding comfort | 107 | 110 | 102 | 104 | 100 | 97 | 95 | 93 | 106 | 102 |
| Residue CF index | 80 | 35 | 90 | 50 | 100 | 130 | 110 | 140 | 100 | 120 |

Em.; Embodiment
CO.; Comparative example

TABLE 2

| Pattern | Em.2-1 FIG.14 | Em.2-2 FIG.14 | Em.2-3 FIG.15 | Em.2-4 FIG.16 | Co.2-1 FIG.14 | Co.2-2 FIG.15 | Co.2-3 FIG.16 |
|---|---|---|---|---|---|---|---|
| Belt cord | | | | | | | |
| N × S | 12.2 | 12.2 | 14.5 | 14.5 | 15.4 | 15.4 | 20.5 |
| Inclination angle Lateral groove GsL in left outside area | 21 | 25 | 21 | 25 | 21 | 18 | 21 |
| Inclination angle ($\theta$sL) | 20 | 20 | 0 | 15 | 20 | 20 | 20 |
| Direction | Right lower | Right lower | — | Right lower | Right lower | Right lower | Right lower |
| Circumferential pitch Pc (mm) Lateral groove GsR in right outside area | 18 | 18 | 18 | 18 | 18 | 18 | 18 |
| Inclination angle ($\theta$sR) | 20 | 15 | 0 | 12 | 10 | 0 | 10 |
| Direction | Right upper | Right upper | — | Right upper | Right upper | — | Right upper |
| Circumferential pitch Ps (mm) Lateral groove GcL in left inside area | 18 | 18 | 18 | 18 | 18 | 18 | 18 |
| Inclination angle ($\theta$cL) | 30 | 30 | 30 | 0 | 30 | 30 | 0 |
| Direction | Right upper | Right upper | Right upper | — | Right upper | Right upper | — |
| Circumferential pitch Pc (mm) Lateral groove GcR in right inside area | 18 | 18 | 18 | 18 | 18 | 18 | 18 |
| Inclination angle ($\theta$cR) | 30 | 25 | 30 | 0 | 30 | 30 | 30 |
| Direction | Right lower | Right lower | Right lower | — | Right lower | Right lower | Right lower |
| Circumferential pitch Ps (mm) | 18 | 18 | 18 | 18 | 18 | 18 | 18 |
| Riding comfort | 108 | 110 | 103 | 105 | 100 | 96 | 95 |
| Residue CF index | 73 | 24 | 78 | 35 | 100 | 160 | 130 |

TABLE 2-continued

| Pattern | Em.2-1 FIG.14 | Em.2-2 FIG.14 | Em.2-3 FIG.15 | Em.2-4 FIG.16 | Co.2-1 FIG.14 | Co.2-2 FIG.15 | Co.2-3 FIG.16 |
|---|---|---|---|---|---|---|---|

Em.; Embodiment
CO.; Comparative example

TABLE 3

Figure 24:
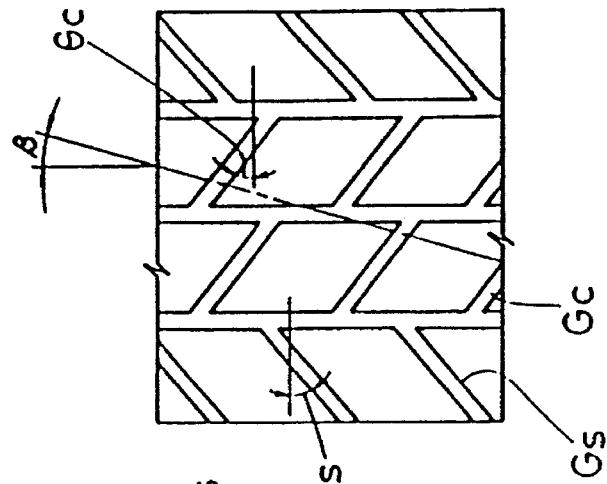
FIG. 24 is a plan view showing the pattern of a comparison example.

| Pattern | Em. 3-1 FIG.19 | Em. 3-2 FIG.20 | Co. 3-1 FIG.24 |
|---|---|---|---|
| Belt cord | | | |
| Material | Steel | Steel | Steel |
| Number of plies | 2 | 2 | 2 |
| Cord | 1 × 4 × 0.22 | 1 × 4 × 0.22 | 1 × 4 × 0.22 |
| N × S | 20.5 | 20.5 | 20.5 |
| Direction of outside belt cord | Right upper | Right upper | Right upper |
| Inclination angle | 16 | 16 | 16 |
| Inner lateral groove | | | |
| Inclination angle (θc) | 30 | 30 | 30 |
| Direction | Right upper | Right upper | Left upper |
| Circumferential | 18 | 18 | 18 |
| pitch Pc (mm) | | | |
| Outer lateral groove | | | |
| Inclination angle (θs) | 30 | 30 | 30 |
| Direction | Left upper | Left upper | Right upper |
| Circumferential | 18 | 18 | 18 |
| pitch Ps (mm) | | | |
| Steering of outside belt cord | 110 | 105 | 100 |
| Residue CF index | 5 | 26 | 100 |

Em.; Embodiment
CO.; Comparative example

TABLE 4

Figure 30:
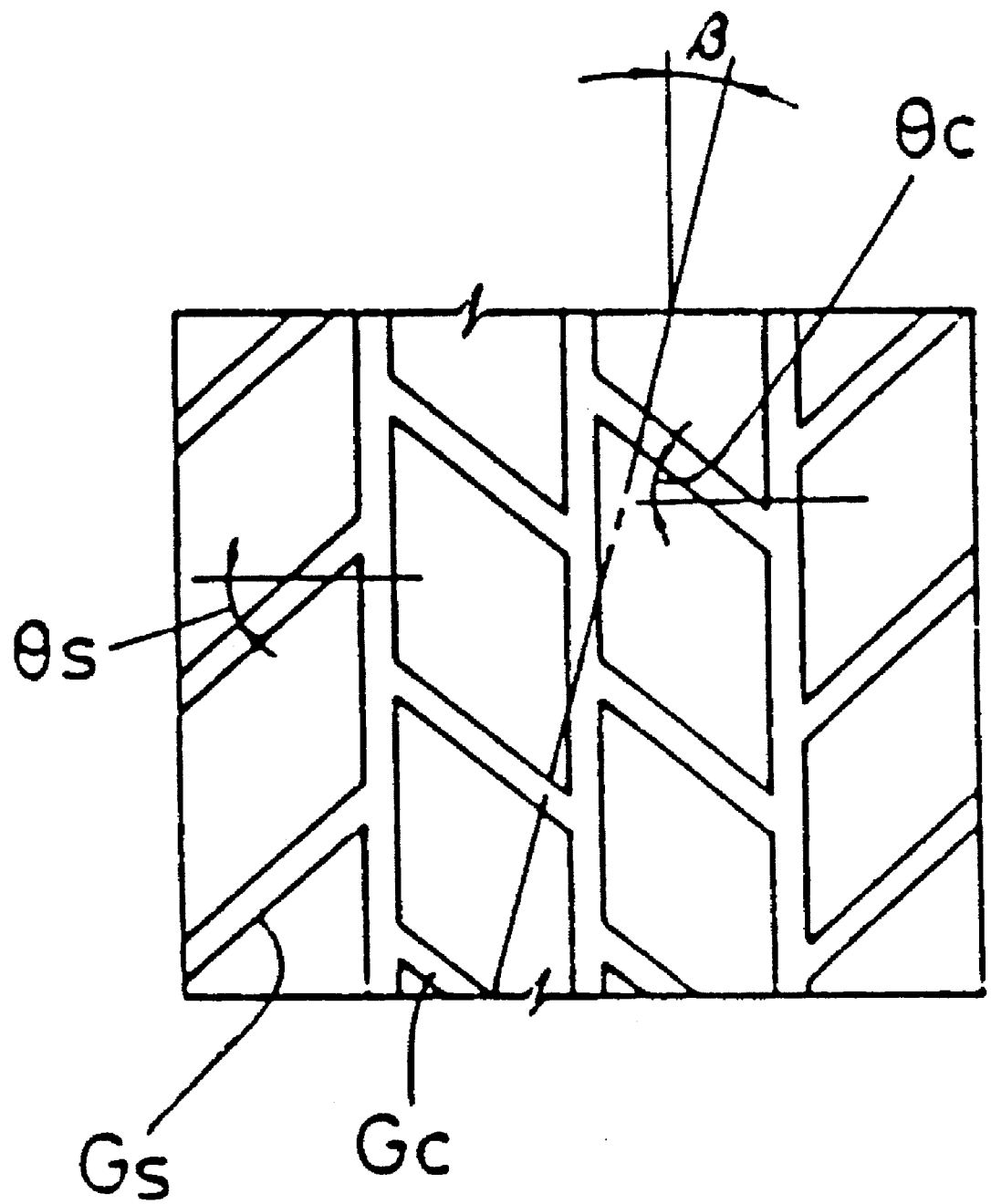
FIG. 30 is a plan view showing the pattern of a comparative example.

| Pattern | Em. 4-1 FIG.25 | Em. 4-2 FIG.25 | Co. 4-1 FIG.25 | Co. 4-2 FIG.25 | Co. 4-3 FIG.30 |
|---|---|---|---|---|---|
| Belt cord | | | | | |
| Material | Steel | Steel | Steel | Steel | Steel |
| Number of plies | 2 | 2 | 2 | 2 | 2 |
| Cord | 1 × 4 × 0.22 | 1 × 4 × 0.22 | 1 × 4 × 0.22 | 1 × 4 × 0.22 | 1 × 4 × 0.22 |
| N × S | 20.5 | 20.5 | 20.5 | 20.5 | 20.5 |
| Direction of outside belt cord | Right upper | Right upper | Right upper | Right upper | Right upper |
| Inclination angle | 18 | 18 | 18 | 18 | 18 |
| Inner lateral groove | | | | | |
| Inclination angle (θc) | 25 | 25 | 25 | 25 | 30 |
| Direction | Right upper | Right upper | Right upper | Right upper | Left upper |
| Circumferential pitch Pc (mm) | 18 | 18 | 18 | 18 | 18 |
| Outer lateral groove | | | | | |
| Inclination angle (θs) | 40 | 40 | 40 | 40 | 30 |
| Direction | Left upper | Left upper | Left upper | Left upper | Right upper |
| Circumferential pitch Ps (mm) | 15 | 20 | 30 | 40 | 18 |
| Steering of stability | 110 | 105 | 100 | 100 | 100 |
| Residue CF index | 24 | 26 | 39 | 49 | 100 |

Em.; Embodiment
CO.; Comparative example

TABLE 5

| Pattern | Em. 5-1 FIG.32 | Em. 5-2 FIG.32 | Em. 5-3 FIG.33 | Co. 5-1 FIG.32 | Co. 5-2 FIG.32 | Co. 5-3 FIG.32 | Co. 5-4 FIG.11(c) |
|---|---|---|---|---|---|---|---|
| Belt cord | | | | | | | |
| Material | Steel | Steel | Steel | Steel | Steel | Steel | Steel |
| Number of plies | 2 | 2 | 2 | 2 | 2 | 2 | 2 |
| Cord | 1 × 4 × 0.22 | 1 × 4 × 0.22 | 1 × 4 × 0.22 | 1 × 4 × 0.22 | 1 × 4 × 0.22 | 1 × 4 × 0.22 | 1 × 4 × 0.22 |

TABLE 5-continued

| Pattern | Em. 5-1 FIG.32 | Em. 5-2 FIG.32 | Em. 5-3 FIG.33 | Co. 5-1 FIG.32 | Co. 5-2 FIG.32 | Co. 5-3 FIG.32 | Co. 5-4 FIG.11(c) |
|---|---|---|---|---|---|---|---|
| N × S | 20.5 | 20.5 | 20.5 | 20.5 | 20.5 | 20.5 | 20.5 |
| Direction of outside belt cord | Right upper | Right upper | Right upper | Right upper | Right upper | Right upper | Right upper |
| Middle lateral groove | | | | | | | |
| Inclination angle (θm) | 30 | 30 | 30 | 30 | 30 | 30 | |
| Direction | Crossed | Crossed | Crossed | Crossed | Crossed | Crossed | — |
| Maximum length L (mm) | 5 | 10 | 10 | 15 | 20 | 30 | |
| Outer lateral groove | | | | | | | |
| Inclination angle (θn) | Lateral | Lateral | 8 | Lateral | Lateral | Lateral | 35 (θs) |
| Direction | — | — | Right lower | — | — | — | Right lower |
| Circumferential pitch Ps (mm) | 18 | 18 | 18 | 18 | 18 | 10 | 18 |
| Steering stability | 105 | 105 | 105 | 100 | 95 | 95 | 105 |
| Residue CF index | 70 | 30 | 80 | 100 | 135 | 170 | 70 |
| Noise characteristic | 90 | 95 | 105 | 100 | 105 | 110 | 115 |

Em.; Embodiment
CO.; Comparative example

What we claim is:

1. A pneumatic radial tire comprising a pair of bead portions, a bead core disposed in each of said bead portions, a carcass extending between the pair of bead portions and turned up around each of the bead cores, a belt comprising at least two plies of steel cords disposed radially outside the carcass, said steel belt cords in each of said at least two belt plies laid at an inclination of 18 degrees or less with respect to the tire equator, one of said at least two plies being the radially outermost ply, each of said at least two belt plies having a cord quantity NS of 18.0 mm² or more, wherein the cord quantity NS is defined as the total cross sectional area of said steel belt cords S (mm²) per 10 centimeters width of belt ply, a tread portion disposed radially outside the carcass and having a pair of tread edges, said tread portion including only four straight circumferential grooves made up of a pair of axially outer circumferential grooves and a pair of axially inner circumferential grooves, said tread portion being divided in the axial direction of the tire into four circumferential regions having substantially equal axial widths made up of a pair of axially inner circumferential regions, one of said inner circumferential regions extending axially outward from each side of the tire equator, and a pair of axially outer circumferential regions, one of said outer circumferential regions extending axially inward from each said tread edge, one of said pair of axially outer circumferential grooves disposed axially between the axially inner and outer circumferential regions, and one of said pair of axially inner circumferential grooves disposed in each said axially inner circumferential regions, said tread portion being provided with a plurality of first lateral grooves, a plurality of second lateral grooves and a plurality of third lateral grooves, said first lateral grooves being disposed in each of said outer circumferential regions, each of said first lateral grooves having a first part and a second part, said first part having an axially outer end and a length exceeding 70% of the axial width of each of said outer circumferential regions and being inclined at a first inclination angle of 40 degrees or less with respect to the axial direction of the tire, said first inclination angle being reverse to the inclination of the cords of the outermost ply, said second part extending between said outer end to said tread edge, said second lateral grooves being disposed in each of said inner circumferential regions, each of said second lateral grooves being divided by intersection with one of said axially inner circumferential grooves into a primary part and a secondary part, each said primary part and each said secondary part having a blind end, said blind end of said secondary part being disposed axially near the tire equator and said blind end of said primary part being disposed axially apart from the tire equator, said second lateral grooves being inclined at a second inclination angle of 35 degrees or less with respect to the axial direction of the tire, said second inclination angle inclining along the inclination of said cords of the outermost ply and said second inclination angle being reverse to said first inclination angle, and said third lateral grooves being disposed to each of said inner circumferential regions, each of said third lateral grooves having an axially inward blind end and an axially outward end which opens to one of said axially outer circumferential grooves and being inclined at a third inclination angle of 35 degrees or less with respect to the axial direction of the tire, said third inclination angle inclining along the inclination of said cords of the outermost ply.

2. The tire according to claim 1, wherein a first circumferential pitch between each adjacent pair of said first lateral grooves is substantially 20 mm or less, a second circumferential pitch between each adjacent pair of said second lateral grooves is substantially 20 mm or less, and a third circumferential pitch between each adjacent pair of said third lateral grooves is substantially 20 mm or less.

* * * * *